US012621084B2

(12) United States Patent
Loehr et al.

(10) Patent No.: US 12,621,084 B2
(45) Date of Patent: May 5, 2026

(54) SL HARQ BUFFER MANAGEMENT FOR NR VEHICULAR COMMUNICATION

(71) Applicant: Lenovo (Singapore) Pte. Ltd., New Tech Park (SG)

(72) Inventors: Joachim Loehr, Wiesbaden (DE); Prateek Basu Mallick, Dreieich (DE); Karthikeyan Ganesan, Kronberg im Taunus (DE); Ravi Kuchibhotla, Chicago, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/358,888

(22) Filed: Jul. 25, 2023

(65) Prior Publication Data

US 2023/0379089 A1      Nov. 23, 2023

Related U.S. Application Data

(63) Continuation of application No. 16/918,705, filed on Jul. 1, 2020, now abandoned.
(Continued)

(51) Int. Cl.
| | |
|---|---|
| *H04L 1/1812* | (2023.01) |
| *H04L 1/1867* | (2023.01) |
| *H04L 5/00* | (2006.01) |
| *H04W 4/40* | (2018.01) |
| *H04W 28/02* | (2009.01) |
| *H04W 72/1268* | (2023.01) |
| *H04W 72/50* | (2023.01) |
| *H04W 92/18* | (2009.01) |

(52) U.S. Cl.
CPC .......... *H04L 1/1819* (2013.01); *H04L 1/1874* (2013.01); *H04L 5/0055* (2013.01); *H04L 5/0094* (2013.01); *H04W 4/40* (2018.02); *H04W 28/0278* (2013.01); *H04W 72/1268* (2013.01); *H04W 72/535* (2023.01); *H04W 92/18* (2013.01)

(58) Field of Classification Search
CPC ... H04L 1/1819; H04L 1/1854; H04L 1/1861; H04L 1/1896; H04L 5/0058; H04W 72/02; H04W 76/11; H04W 76/23
USPC .......................................... 370/311, 328, 329
See application file for complete search history.

(56) References Cited

U.S. PATENT DOCUMENTS

2019/0124015 A1* 4/2019 Loehr ................... H04L 5/0058
2020/0344771 A1   10/2020 Kang et al.
(Continued)

OTHER PUBLICATIONS

3GPP, 3rd Generation Partnership Project; Technical Specification Group Radio Access Network; NR; Medium Access Control (MAC) protocol specification (Release 15), 3GPP TS 38.321 V15.6.0, Jun. 2019.
(Continued)

*Primary Examiner* — Harun Chowdhury
(74) *Attorney, Agent, or Firm* — Kunzler Needham & Hilton

(57) ABSTRACT

Apparatuses, methods, and systems are disclosed for scheduling a sidelink transmission. One apparatus includes a processor and a transceiver that receives a TB on SL resources, where the TB is associated with a SL HARQ process. The processor stores the TB in a HARQ soft buffer and makes available the HARQ soft buffer for new data in response to a predefined trigger.

21 Claims, 9 Drawing Sheets

Related U.S. Application Data

(60) Provisional application No. 62/869,436, filed on Jul. 1, 2019.

(56) References Cited

U.S. PATENT DOCUMENTS

| | | | | |
|---|---|---|---|---|
| 2021/0160014 | A1* | 5/2021 | Selvanesan | H04L 1/1819 |
| 2021/0274545 | A1 | 9/2021 | Adjakple et al. | |
| 2021/0377912 | A1* | 12/2021 | El Hamss | H04L 1/1854 |
| 2022/0174682 | A1* | 6/2022 | Li | H04W 76/23 |
| 2022/0360374 | A1* | 11/2022 | Yoshioka | H04L 1/1896 |

OTHER PUBLICATIONS

Ericsson, "Reply LS to RAN2 on mode-1 retransmission indication", 3GPP TSG RAN WG1 Meeting #97 R1-1907905, May 13-17, 2019, p. 1.
Huawei, Hisilicon, "Further discussion on SR configuration and procedure for NR SL Mode-1", 3GPP TSG-RAN WG2 # 106 R2-1907450, May 13-17, 2019, pp. 1-9.

* cited by examiner

700

Start

705 — Transmit a first TB on SL resources using a first SL mode, where the TB is associated with a first SL HARQ process 710 — Detect a HARQ protocol error associated with the TB 715 — Retransmit the TB on SL resources using a second SL mode in response to the HARQ protocol error End

800

Start

805 ∿ Receive a TB on SL resources, where the TB is associated with a SL HARQ process 810 ∿ Store the TB in a HARQ soft buffer 815 ∿ Make available the HARQ soft buffer for new data in response to a predefined trigger End

SL HARQ BUFFER MANAGEMENT FOR NR VEHICULAR COMMUNICATION

FIELD

The subject matter disclosed herein relates generally to wireless communications and more particularly relates to sidelink HARQ operation and buffer management for NR vehicular communication.

BACKGROUND

The following abbreviations are herewith defined, at least some of which are referred to within the following description: Third Generation Partnership Project ("3GPP"), Fifth Generation Core ("5GC"), Fifth Generation System ("5GS"), Authentication, Authorization and Accounting ("AAA"), Access and Mobility Management Function ("AMF"), Positive-Acknowledgment ("ACK"), Application Programming Interface ("API"), Base Station ("BS"), Control Element ("CE"), Core Network ("CN"), Control Plane ("CP"), Dedicated Short Range Communication ("DSRC"), Downlink Control Information ("DCI"), Downlink ("DL"), Discontinuous Transmission ("DTX"), Enhanced Mobile Broadband ("eMBB"), Evolved Node-B ("eNB"), Evolved Packet Core ("EPC"), General Packet Radio Service ("GPRS"), Global System for Mobile Communications ("GSM"), Hybrid Automatic Repeat Request ("HARQ"), Home Subscriber Server ("HSS"), Log Likelihood Ratio ("LLR"), Long Term Evolution ("LTE"), Multiple Access ("MA"), Mobility Management ("MM"), Mobility Management Entity ("MME"), Negative-Acknowledgment ("NACK") or ("NAK"), New Generation (5G) Node-B ("gNB"), New Radio ("NR", a 5G radio access technology; also referred to as "5G NR"), Network Slice Selection Assistance Information ("NSSAI"), Packet Data Unit ("PDU", used in connection with 'PDU Session'), Physical Broadcast Channel ("PBCH"), Physical Downlink Control Channel ("PDCCH"), Physical Downlink Shared Channel ("PDSCH"), Physical Random Access Channel ("PRACH"), Physical Uplink Control Channel ("PUCCH"), Physical Uplink Shared Channel ("PUSCH"), Public Land Mobile Network ("PLMN"), Quality of Service ("QoS"), Radio Access Network ("RAN"), Radio Access Technology ("RAT"), Random-Access Channel ("RACH"), Receive ("Rx"), Scheduling Request ("SR"), Shared Channel ("SCH"), Session Management ("SM"), Session Management Function ("SMF"), Single Network Slice Selection Assistance Information ("S-NSSAI"), System Information Block ("SIB"), Transport Block ("TB"), Transmit ("Tx"), Unified Data Management ("UDM"), User Data Repository ("UDR"), Uplink Control Information ("UCI"), User Entity/Equipment (Mobile Terminal) ("UE"), Uplink ("UL"), User Plane ("UP"), Universal Mobile Telecommunications System ("UMTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK") and Discontinuous Transmission ("DTX"). ACK means that a TB is correctly received while NACK (or NAK) means a TB is erroneously received. DTX means that no TB was detected.

In certain wireless communication systems, V2X communication allows vehicles to communicate with moving parts of the traffic system around them. Two resource allocation modes are used in LTE V2x communication which are also considered as a baseline for corresponding resource allocation modes in NR v2x communication. Mode-1 corresponds to a NR network-scheduled V2X communication mode. Mode-2 corresponds to an LTE network-scheduled V2X communication mode. Mode-3 corresponds to a NR UE-scheduled V2X communication mode. Mode-4 corresponds to an LTE UE-scheduled V2X communication mode.

In LTE V2X HARQ operation is limited to blind retransmission without any HARQ feedback. NR V2X communication may support HARQ feedback signaling for SL transmission. However, UE behavior for SL HARQ protocol operation for NR V2X communication is not specified.

BRIEF SUMMARY

Methods for scheduling a sidelink transmission are disclosed. Apparatuses and systems also perform the functions of the methods.

One method of a remote unit, e.g., a UE, for scheduling a sidelink transmission includes configuring a set of SL LCHs with at least one Uu LCH restriction parameter, wherein the SL LCHs communicate data over a PC5 interface. The method includes receiving, via internal process, a SL buffer status reporting trigger for a first SL LCH and determining that an UL-SCH resource for a new transmission is available. The method includes determining that the at least one Uu LCH restriction parameter of the first SL LCH does not match the uplink transmission parameters associated with the UL-SCH resources available for the new transmission and triggering a Scheduling Request to a base unit via a Uu interface for PC5 resources.

One method of a remote unit, e.g., a Tx UE, for scheduling a sidelink transmission includes transmitting a first TB on SL resources using a first SL mode, where the TB is associated with a first SL HARQ process. The method includes detecting a HARQ protocol error associated with the TB and retransmitting the TB on SL resources using a second SL mode in response to the HARQ protocol error.

One method of a remote unit, e.g., a Rx UE, for scheduling a sidelink transmission includes receiving a TB on SL resources, where the TB is associated with a SL HARQ process. The method includes storing the TB in a HARQ soft buffer and making available the HARQ soft buffer for new data in response to a predefined trigger.

One method of a remote unit, e.g., a Rx UE, for scheduling a sidelink transmission includes receiving a TB on SL resources, where the TB is associated with predefined number of blind HARQ retransmissions. The method includes decoding the TB and determining whether the TB is correctly decoded. In response to correctly decoding the TB, the method includes sending a positive HARQ acknowledgement prior to a last of the blind HARQ retransmissions. Otherwise, the method includes sending a negative HARQ acknowledgement in response to incorrectly decoding an initial transmission of the TB and each of the blind HARQ retransmissions the TB, where no negative HARQ acknowledgement is sent prior to receiving the last of the blind HARQ retransmissions.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
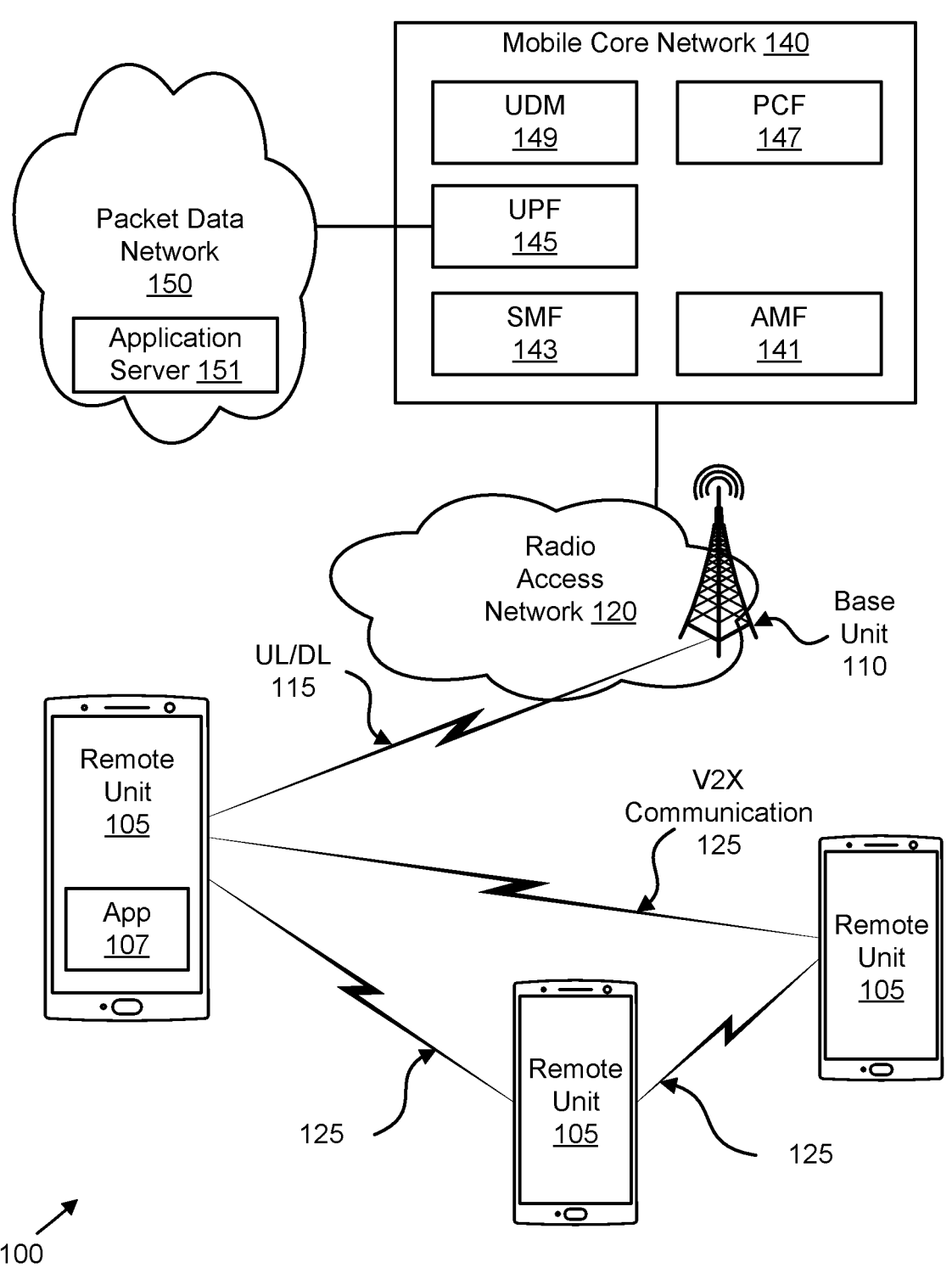
FIG. 1 is a schematic block diagram illustrating one embodiment of a wireless communication system for scheduling a sidelink transmission.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for sidelink HARQ buffer management in NR V2X communication, e.g., of UEs engaged in V2X communication. Mode-3 and Mode-4 support direct LTE V2X communications but differ on how they allocate the radio resources. For Mode-3, resources are allocated by the cellular network, e.g., eNB. Mode-4 does not require cellular coverage, and vehicles (UEs) autonomously select their radio resources using a distributed scheduling scheme supported by congestion control mechanisms. Mode-4 is considered the baseline mode and represents an alternative to 802.11p or dedicated short range communications (DSRC).

Both resource allocation Mode-3 and Mode-4 have been designed to satisfy the latency requirements and accommodate high Doppler spreads and high density of vehicles for V2X communications. Here, the maximum allowed latency varies between 20 and 100 ms, depending on the application. Mode-3 uses the centralized eNB scheduler as mentioned before. The vehicular UE and eNB use the Uu interface to communicate, e.g., sending of BSR/SR from the transmitting V2X UE to the eNB and receiving in response a SL grant on the PDCCH (DCI).

Mode-4 uses the PC5 interface, which offers direct LTE sidelink (SL) between two vehicular UEs. Mode-4 employs distributed UE scheduling and operates without infrastructure support, even when the UEs is in eNB coverage. Note that LTE sidelink resources are shared with the LTE uplink. Both LTE duplexing modes (e.g., time and frequency division duplexing) are supported.

As mentioned above, NR V2X design uses LTE V2X operation as a baseline. NR V2X also supports both a centralized scheduling mode (e.g., network-scheduled) and a distributed scheduling mode (e.g., UE-scheduled). The two resource allocation modes in NR V2X will be referred to as resource allocation Mode-1 and Mode-2.

For NR V2X it is assumed that HARQ with HARQ feedback signaling is supported for SL transmissions, e.g., at least for unicast and potentially for groupcast SL transmission. LTE V2X HARQ operation was restricted to blind retransmissions without any HARQ feedback. The support of HARQ operation with HARQ feedback for SL transmission raises several questions on how the sidelink HARQ processes are managed respectively maintained for the different cast types, i.e., unicast, groupcast and broadcast, and resource allocation modes. In particular the HARQ operation at the transmitting and receiving V2X UE for a SL transmission in the presence of protocol errors, e.g., NACK to ACK, DTX to ACK errors due to the erroneous physical layer decoding, needs to be defined. Furthermore, the UE behavior for cases when the transmitting V2X UE switches the scheduling mode for different HARQ (re)transmissions of a TB transmitted on the PSSCH needs to be specified.

According to the current NR standard, the HARQ transmission buffer of a UE is controlled by the network by means of the New Data Indicator (NDI) signaled for a given HARQ process within a DCI. For network-controller HARQ buffer management, if the UE receives a DCI containing an NDI value which is toggled compared to the last received NDI value for the same HARQ process, then the UE will store another generated TB in the transmission buffer of this HARQ process and hence delete the previously stored TB. Because for NR V2X, the Tx UE 310 may share the HARQ buffer of the HARQ processes among Mode-1 and Mode-2 transmissions, there should be some upper limit defined for how long a TB is stored in the transmission of a HARQ process; respectively, it should be specified when the Tx UE 310 can use a HARQ process for the transmission of a new TB.

The present disclosure outlines several methods for an efficient SL HARQ protocol operation for NR V2X. In particular, the HARQ operation for a SL transmission in the resource allocation Mode-1 is disclosed. Furthermore, the UE behavior for cases when the transmitting V2X UE switches the cast type for different HARQ (re)transmissions of a TB transmitted on the PSSCH is disclosed.

In NR Rel-15 LCHs may be configured with logical channel restrictions parameters like maxPUSCH_duration, allowedSCS, allowedServingcell, etc. Those parameter are used during LCP procedure for the mapping of LCHs to uplink grants which is also referred to as "LCH mapping restriction", i.e., only LCHs matching the uplink transmission parameters of an uplink grant (SCS, PUSCH duration, etc.) are considered for transmitting data in the corresponding PUSCH transmission. In order to enable efficient scheduling of uplink transmissions by having a closer match of uplink transmission parameters (including numerology and PUSCH transmission duration) for the first PUSCH transmission to logical channel (LCH) requirements, NR supports an early indication to the gNB of the type of traffic on the logical channel(s) triggering the SR, through the use of multiple, single-bit SR configurations.

In order to avoid the situation that a SR for a low latency LCH may not be triggered due to having been allocated a UL-SCH resources with a considerable scheduling delay "K2" or a long PUSCH transmission duration, it was agreed for NR Rel-15 that SR is also triggered for cases when the MAC entity is in possession of an UL-SCH resource that results in higher latency or transmission duration. This is specified in TS38.321 by following condition: if the UL-SCH resources available for a new transmission do not meet the LCP mapping restrictions (see subclause 5.4.3.1) configured for the logical channel that triggered the BSR.

The present disclosure outlines several methods for efficient scheduling of sidelink transmissions for NR V2X. In particular, the SL LCH have Uu restriction parameters used to handle scheduling requests in the resource allocation Mode-1.

In various embodiments, HARQ operation at the V2X receiver side includes identifying some maximum time a soft buffer is occupied in order to allow communication with some other V2X UEs (e.g., other vehicles). In one embodiment, a timer is started at the soft buffer when a TB is first stored there. The timer value may be set according to QoS priority information in the SCI associated with the TB. In certain embodiments there is a linkage between the QoS priority and a packet delay budget (PDB). Moreover, the soft buffer may be flushed when an ACK is sent for the TB stored in the soft buffer. In some embodiments, a TB with a higher priority indicated in SCI may evict from the soft buffer a previously stored TB with a lower priority indicated in SCI. In certain embodiments, a maximum number of HARQ (re)transmissions for the TB is indicated in SCI. In certain embodiments, the packet delay budget is indicated in SCI. In certain embodiments, a flag (or other indication) in SCI may indicate whether the associated TB is the last HARQ retransmission of the TB.

In various embodiments, sidelink HARQ operation in NR V2X communication considers the PDB for autonomous HARQ retransmission. In some embodiments, a timer defines for how long a UE can perform autonomous HARQ retransmission(s) once HARQ protocol error occurred, e.g., NACK-ACK error. In certain embodiments, this timer is started (or restarted) when TB is generated or transmitted or put in HARQ Tx buffer. In certain embodiments, this time is only effective for Mode-2 communications.

In various embodiments, the V2X UE may perform HARQ Tx buffer flushing in order to free HARQ processes for allowing Mode-2 HARQ transmissions. Here, a timer may define when UE can use a HARQ process for new initial HARQ transmissions, i.e., Mode-2 transmissions. In certain embodiments, SL HARQ operation includes stalling of HARQ process which was used by Mode-1 HARQ transmission "last packet". In one embodiment, the DCI indicates flushing of buffer, i.e., DCI includes a "last transmission attempt" indicator. Further, the Tx UE may consider process as available (Mode-2 new transmissions) upon sending a (real) ACK to gNB. Additionally, the Tx UE may consider process as available if a NACK was sent to gNB and a timer is expired.

In various embodiments, when PDB expires the Tx UE should send ACK to gNB (even though packet was not correctly received by Rx UE). In certain embodiments, the Tx UE starts timer when packets arrive in buffer. Additionally, the Tx UE will flush HARQ Tx buffer (at least consider it as available) when the PDB expires.

FIG. 1 depicts a wireless communication system 100 for scheduling a sidelink transmission for wireless devices communicating V2X messages 125, in accordance with aspects of the present disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 110 with which the remote unit 105 communicates using wireless communication links 115. Even though a specific number of remote units 105, base units 110, wireless communication links 115, RANs 120, and mobile core networks 140 are depicted in FIG. 1, one of skill in the art will recognize that any number of remote units 105, base units 110, wireless communication links 115, RANs 120, and mobile core networks 140 may be included in the wireless communication system 100.

In one implementation, the RAN 120 is compliant with the 5G system specified in the 3GPP specifications. In another implementation, the RAN 120 is compliant with the LTE system specified in the 3GPP specifications. More generally, however, the wireless communication system 100 may implement some other open or proprietary communication network, for example WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 110 in the RAN 120 via uplink ("UL") and downlink ("DL") communication signals. Furthermore, the UL and DL communication signals may be carried over the wireless communication links 115. Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone/VoIP application) in a remote unit 105 may trigger the remote unit 105 to establish a PDU session (or other data connection) with the mobile core network 140 via the RAN 120. The mobile core network 140 then relays traffic between the remote unit 105 and the application server 151 in the packet data network 150 using the PDU session. Note that the remote unit 105 may establish one or more PDU sessions (or other data connections) with the mobile core network 140. As such, the remote unit 105 may concurrently have at least one PDU session for communicating with the packet data network 150 and at least one PDU session for communicating with another data network (not shown).

The base units 110 may be distributed over a geographic region. In certain embodiments, a base unit 110 may also be referred to as an access terminal, an access point, a base, a base station, a Node-B, an eNB, a gNB, a Home Node-B, a relay node, a RAN node, or by any other terminology used in the art. The base units 110 are generally part of a radio access network ("RAN"), such as the RAN 120, that may include one or more controllers communicably coupled to one or more corresponding base units 110. These and other elements of radio access network are not illustrated but are well known generally by those having ordinary skill in the art. The base units 110 connect to the mobile core network 140 via the RAN 120.

The base units 110 may serve a number of remote units 105 within a serving area, for example, a cell or a cell sector, via a wireless communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 140 is a 5G core ("5GC") or the evolved packet core ("EPC"), which may be coupled to a packet data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs") 145. The mobile core network 140 also includes multiple control plane functions including, but not limited to, an Access and Mobility Management Function ("AMF") 141 that serves the RAN 120, a Session Management Function ("SMF") 143, a Policy Control Function ("PCF") 147, and a Unified Data Management function ("UDM") 149. In certain embodiments, the mobile core network 140 may also include an Authentication Server Function ("AUSF"), a Unified Data Repository ("UDR"), a Network Repository Function ("NRF") (used by the various NFs to discover and communicate with each other over APIs), or other NFs defined for the 5GC.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a S-NSSAI, while a set of network slices for which the remote unit 105 is authorized to use is identified by NSSAI. In certain embodiments, the various network slices may include separate instances of network functions, such as the SMF 143 and UPF 145. In some embodiments, the different network slices may share some common network functions, such as the AMF 141. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like. In certain embodiments, the mobile core network 140 may include a AAA server.

While FIG. 1 depicts components of a 5G RAN and a 5G core network, the described embodiments for using a pseudonym for access authentication over non-3GPP access apply to other types of communication networks and RATs, including IEEE 802.11 variants, GSM, GPRS, UMTS, LTE variants, CDMA 2000, Bluetooth, ZigBee, Sigfoxx, and the like. For example, in an 4G/LTE variant involving an EPC, the AMF may be mapped to an MME, the SMF mapped to a control plane portion of a PGW and/or to an MME, the UPF may be mapped to an SGW and a user plane portion of the PGW, the UDM/UDR may be mapped to an HSS, etc.

In various embodiments, the remote units 105 may communicate directly with each other (e.g., device-to-device communication) using V2X communication signals 125. Here, V2X transmissions may occur on V2X resources. As discussed above, a remote unit 105 may be provided with different V2X communication resources for different V2X modes. Mode-1 corresponds to a NR network-scheduled V2X communication mode. Mode-2 corresponds to an LTE network-scheduled V2X communication mode. Mode-3 corresponds to a NR UE-scheduled V2X communication mode. Mode-4 corresponds to an LTE UE-scheduled V2X communication mode.

Moreover, the remote units 105 implement SL HARQ processes for at least some data transferred over V2X communication signals 125. In various embodiments, HARQ operation at the receiving remote unit 105 includes identifying some maximum time a soft buffer is occupied in order to allow communication with some other V2X remote units 105 (e.g., other vehicles). In one embodiment, a timer is started at the soft buffer when a TB is first stored there. The timer value may be set according to QoS priority information in the SCI associated with the TB. In certain embodiments there is a linkage between the QoS priority and a packet delay budget (PDB). Moreover, the soft buffer may be flushed when an ACK is sent for the TB stored in the soft buffer. In some embodiments, a TB with a higher priority indicated in SCI may evict from the soft buffer a previously stored TB with a lower priority indicated in SCI. In certain embodiments, a maximum number of HARQ (re)transmissions for the TB is indicated in SCI. In certain embodiments, the packet delay budget is indicated in SCI. In certain embodiments, a flag (or other indication) in SCI may indicate whether the associated TB is the last HARQ retransmission of the TB.

In various embodiments, sidelink HARQ operation in NR V2X communication considers the PDB for autonomous HARQ retransmission. In some embodiments, a timer defines for how long a remote unit 105 can perform autonomous HARQ retransmission(s) once HARQ protocol error occurred, e.g., NACK-ACK error. In certain embodiments, this timer is started (or restarted) when TB is generated or transmitted or put in HARQ Tx buffer. In certain embodiments, this time is only effective for Mode-2 communications.

In various embodiments, the V2X remote unit 105 may perform HARQ Tx buffer flushing in order to free HARQ processes for allowing Mode-2 HARQ transmissions. Here, a timer may define when remote unit 105 can use a HARQ process for new initial HARQ transmissions, i.e., Mode-2 transmissions. In certain embodiments, SL HARQ operation includes stalling of HARQ process which was used by Mode-1 HARQ transmission "last packet". In one embodiment, the DCI indicates flushing of buffer, i.e., DCI includes a "last transmission attempt" indicator. Further, the transmitting remote unit 105 may consider a HARQ process as available (Mode-2 new transmissions) upon sending a (real) ACK to the base unit 110. Additionally, the transmitting remote unit 105 may consider a HARQ process as available if a NACK was sent to the base unit 110 and a timer is expired.

In various embodiments, when PDB expires the transmitting remote unit 105 should send ACK to the base unit 110 (even though packet was not correctly received by the receiving remote unit 105). In certain embodiments, the transmitting remote unit 105 starts timer when packets arrive in buffer. Additionally, the transmitting remote unit 105 will flush HARQ Tx buffer (at least consider it as available) when the PDB expires.

In the following descriptions, the term eNB/gNB is used for the base station but it is replaceable by any other radio access node, e.g., BS, eNB, gNB, AP, NR, etc. Further the operations are described mainly in the context of 5G NR. However, the proposed solutions/methods are also equally applicable to other mobile communication systems supporting serving cells/carriers being configured for Sidelink Communication over PC5 interface.

Figure 2:
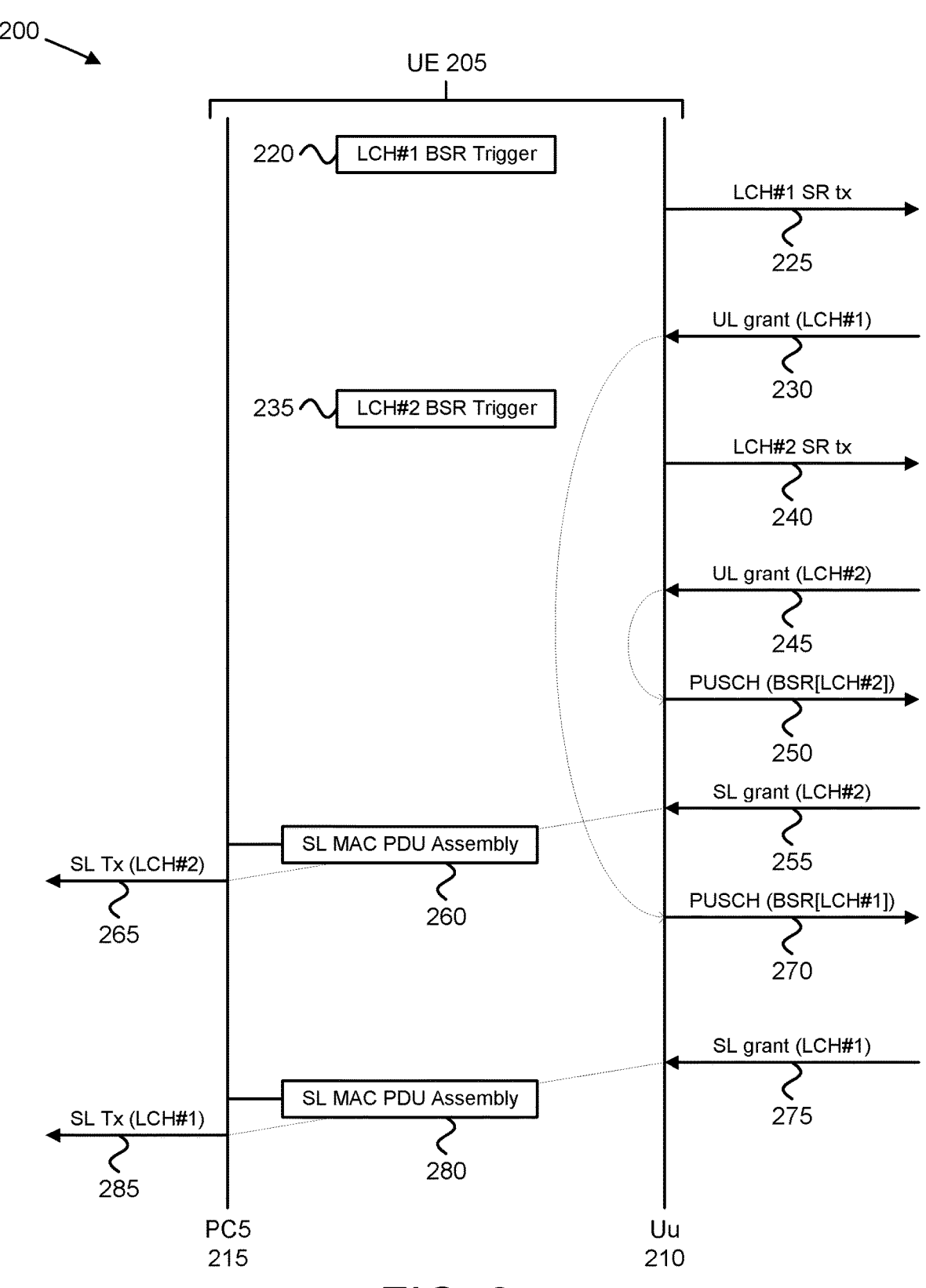
FIG. 2 is a diagram illustrating one embodiment of a SR procedure for a transmitting V2X UE.

FIG. 2 depicts a diagram 200 for SL scheduling request ("SR") triggering at a UE 205. The UE 205 may be one embodiment of the remote unit 105. The UE 205 supports a Uu interface 210 for communicating with a RAN node (e.g., gNB) and also supports a PC5 interface 215 for communicating with one or more UEs (e.g., V2X UEs). Data generated at the UE 205 may be uplink data destined for the RAN node or may be sidelink data destined, e.g., for a V2X UE. Uplink data is mapped to one or more uplink logical channels ("UL LCHs"), while sidelink data is mapped to one or more sidelink logical channels ("SL LCH"). Note that for NR V2X, the SL BSR which is transmitted on the PUSCH (Uu) carries information on the SL LCHs. Therefore, according to a first solution, the UE 205 is configured with a relation between the SL LCHs and the Uu PUSCH resources.

In the depicted embodiments, the UE 205 supports multiple SL LCHs. Here, it is assumed that the UE 205 is configured with at least a first SL LCH (shown as LCH #1) associated with a first traffic type and a second SL LCH (shown as LCH #2) associated with a second traffic type requiring low latency. Note that the UE 205 may be configured with additional SL LCHs. Additionally, the UE 205 may be configured with at least one UL LCH. Moreover, the described solutions are also applicable where the UE 205 is configured with only one SL LCH. For NR SL Mode-1 operation, the UE 205 sends a SL SR/BSR on the Uu interface to the gNB in order to provide the gNB with buffer status info necessary for allocating efficiently SL resources on the PC5 interface.

In some embodiments, the SL LCHs are each configured with Uu LCH restriction parameters. These Uu LCH restriction parameters are used for NR V2X Mode-1 operation for the triggering of a SL SR when the UE has UL-SCH resources available for a new transmission. In NR Rel-15 Uu LCHs may be configured with logical channel restrictions parameters like maxPUSCH_duration, allowedSCS, allowedServingcell, etc. These parameters are used during LCP procedure for the mapping of UL LCHs to Uplink resource grants. As such, the LCH Uu restriction parameter may also be referred to as "LCH mapping restriction", as only LCHs matching the uplink transmission parameters of an uplink grant (SCS, PUSCH duration, etc.) are considered for transmitting data in the corresponding PUSCH transmission.

In various embodiments of the first solution, a UE operating in NR V2X Mode-1 triggers a SR for a SL LCH, e.g., low latency SL LCH (i.e., LCH #2), when the UE 205 has a UL-SCH resource available that results in higher latency or transmission duration. In other words, the UE 205 may compare the QoS associated with the SL LCH, i.e., latency (PDB), with the PUSCH duration, SCS, etc. of the UL-SCH allocation on the Uu interface. In some embodiments a SL LCH may be configured with Uu LCH restriction parameters like maxPUSCH_duration, allowedSCS, etc. UE may compare the Uu LCH restriction parameter configured for a SL LCH with the PUSCH duration, SCS, etc. of the UL-SCH allocation on the Uu interface in order to determine whether to trigger a SR.

Upon detecting (internal) a SL BSR trigger for the first SL LCH (i.e., associated with normal priority traffic—see block 220), the UE 205 transmits a first SL SR to the RAN Node (see messaging 225). The UE 205 may receive a corresponding grant (depicted here as a UL grant) for the normal priority traffic (see messaging 230). The UL grant indicates a UL-SCH resource (i.e., PUSCH resource) at a future time.

Later, upon detecting (internal) a SL BSR trigger for the second LCH (i.e., associated with high priority and/or low latency traffic—see block 235), the UE 205 identifies that a UL-SCH resource is available (i.e., PUSCH resource 270). However, as discussed in greater detail below, the SL BSR triggered by the second LCH cannot use the UL-SCH resource (e.g., because the UL-SCH resources available for a new transmission do not meet the LCP mapping restrictions configured for the second SL logical channel that triggered the SL BSR) and so transmits a second SL SR to the RAN Node (see messaging 240). The UE 205 may receive a corresponding grant (depicted here as a UL grant) for the SL BSR triggered by the high priority traffic (see messaging 245).

In order to avoid the situation that a SL SR for a low latency SL LCH may not be triggered due to having been allocated a PUSCH resource (i.e., PUSCH resource 270) with a considerable scheduling delay or a long PUSCH transmission duration, FIG. 2 shows the UE 205 transmitting a SR triggered by SL LCH #2 even though the UE has UL-SCH resources available for a new transmission (see messaging 240). While FIG. 2 depicts the UL-SCH resource being granted to the UE 205 in response to a SL SR, in other embodiments the UL-SCH resources which the UE 205 has available may be allocated by gNB in response to having received UL SR (for Uu).

In various embodiments of the first solution, SR is triggered for a low latency SL LCH (i.e., LCH #2) when the UE 205 has a UL-SCH resource available (i.e., PUSCH resource 270) that results in higher latency or transmission duration. In other words, the UE 205 may compare the QoS associated with the SL LCH, i.e., latency (PDB), with the PUSCH duration, SCS, etc. of the UL-SCH allocation on the Uu interface.

In the depicted embodiment, the UE 205 transmits a SL BSR for the second LCH (see messaging 250) using UL-SCH resource(s) granted in response to the SL SR 240 for the second LCH. The UE 205 receives a SL grant for the second LCH (see messaging 255). Here, the UE 205 prepares a SL TB (see SL MAC PDU assembly; block 260) and transmits SL data for the second LCH via the PC5 interface (see messaging 265).

Using the UL-SCH resource granted in response to the SL SR 225 for the first LCH, the UE 205 transmits a SL BSR for the first LCH (see messaging 270). The UE 205 receives a SL grant for the first LCH (see messaging 275). Again, the UE 205 prepares a SL TB (see SL MAC PDU assembly; block 280) and transmits SL data for the first LCH via the PC5 interface (see messaging 285).

In some embodiments of the first solution, the UE 205 is to trigger a SL SR for cases when the UE 205 is scheduled with a PUSCH transmission for a MAC PDU including a SL BSR MAC CE which is scheduled later than the next PUCCH transmission occasion of the SL SR configuration of a SL LCH that triggered a SL BSR and if the SL LCH that triggered a BSR is configured to send a SR when UE has an UL-SCH allocation. According to this embodiment, a SL LCH has an associated configuration indicating whether SL SR shall be triggered when UL-SCH resource are available for a new transmission. Essentially, only low latency SL LCHs would be configured such that SR is triggered even though UL-SCH resources are available, i.e., when PUSCH resources carrying the SL BSR are later than the next PUCCH transmission occasion for the SL SR.

According to another embodiment of the first solution, a threshold in terms of a maximum time is configured for a SL LCH which is used to determine whether a SL SR shall be triggered for cases when the UE 205 has been allocated UL-SCH resources for a new transmission. In case the UL-SCH resources are more than the configured threshold ahead, i.e., measured from the time point when SL BSR has been triggered (for a low latency SL LCH), the UE 205 still triggers the SL SR.

In various embodiments of the first solution, a UE 205 may perform SL SR and RACH in parallel. In NR Rel-15 a scheduling request can be transmitted via a configured SR resources on PUCCH or via the random access procedure. The UE 205 may perform random access procedure and SR procedure in parallel, i.e., some LCHs may be configured with SR resources on PUCCH some other LCHs may not have configured SR resources. According to Rel-15 specifications, the UE 205 may stop, if any, ongoing Random Access procedure due to a pending SR which has no valid PUCCH resources configured, which was initiated by MAC entity prior to the MAC PDU assembly. Such a Random Access procedure may be stopped when the MAC PDU is transmitted using a UL grant other than a UL grant provided by Random Access Response, and this PDU includes a BSR MAC CE which contains buffer status up to (and including) the last event that triggered a BSR.

According to a further embodiment of the first solution, the UE 205 shall not stop any ongoing random access procedure triggered for the purpose of requesting SL resources, i.e., RACH procedure due to a pending SL SR which has no valid PUCCH resources configured, when the UE 205 transmits a MAC PDU on UL resources on the Uu interface which includes a BSR MAC CE which contains buffer status up to (and including) the last event that triggered a BSR prior to the MAC PDU assembly. Only in case a SL BSR MAC CE is included in the MAC PDU which contains the SL buffer status up to (and including) the last event that triggered a SL BSR prior to the MAC PDU assembly, the UE 205 may stop any ongoing random access procedure.

Figure 3:
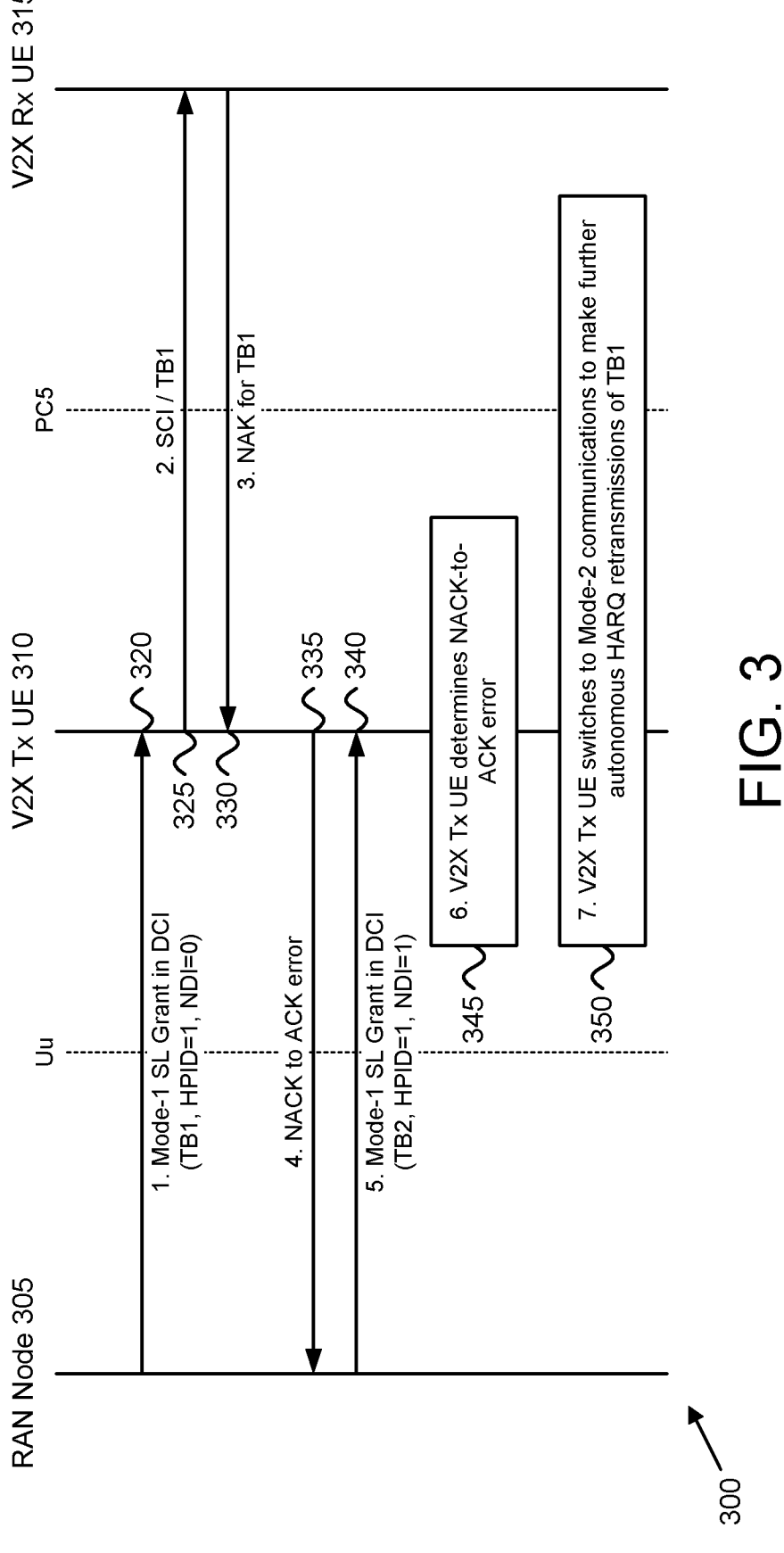
FIG. 3 is a diagram illustrating one embodiment of a NACK-to-ACK error in V2X communication.

FIG. 3 depicts a signaling flow diagram 300 describing a NACK-to-ACK error during V2X operation. The signaling flow diagram 300 involves a RAN node 305, a V2X transmitting UE ("Tx UE") 310, and a V2X receiving UE ("Rx UE") 315. In the depicted embodiment, the UEs 310-315 communicate using V2X Mode-1 (network-scheduled mode).

The RAN node 305 sends a Mode-1 SL grant in DCI (see messaging 320), the Mode-1 grant assigning SL resources for the transmission of a first transmission block, here "TB1". As depicted, the grant indicates HARQ Process ID ("HPID") of '1' and new data indicator ("NDI") is set to '0.' Subsequently, the Tx UE 310 transmits the TB1 using the SL resources and also transmits Sidelink Control Information ("SCI") relating to the transmission of TB1 (see messaging 325).

In the depicted embodiment, the Rx UE 315 does not correctly receive TB1 (e.g., due to reception and/or decoding error), and thus sends a SL NACK indicator to the Tx UE 310 (see messaging 330). The Tx UE 310 requests new SL resources for retransmission of TB1, e.g., by forwarding the SL NACK (see messaging 335). In the depicted example, there is a control channel error on the Uu Interface (between RAN node 305 and Tx UE 310) which results in a NACK-to-ACK error, meaning that the RAN node 305 incorrectly interprets the messaging 335 as an ACK.

Initially, the Tx UE 310 is unaware of the NACK-to-ACK error; however, the Tx UE 310 becomes aware of the error when the RAN node 305 sends a second Mode-1 SL grant in DCI indicating SL resources for an initial (e.g., new)

transmission of a second TB ("TB2", see messaging 340). As the Tx UE 310 expects SL resources for a HARQ retransmission but actually receives a DCI indicating SL resources for an initial transmission, the Tx UE 310 determines that a NACK-to-ACK error occurred (see block 345). Here, the error determination may be based on detecting that the NDI is toggled in the second SL grant (recall, that NDI is toggled to indicate new data, but is not toggled for retransmission). The error determination may also be based on the different TB sizes between TB1 and TB2.

In such embodiments, the Tx UE 310 may autonomously switch to V2X Mode-2 communications to make further autonomous HARQ retransmissions of the first TB (e.g., TB1) (see block 350). In various embodiments, the Tx UE 310 is allowed to perform HARQ retransmissions in V2X Mode-2 for a limited amount of time, as described in further detail below.

According to a second solution, a new timer is used at the Tx UE 310, such timer controlling the time the Tx UE 310 is allowed to perform HARQ (re)transmissions for a Transport Block (e.g., TB1) on the PC5 interface. According to one implementation of the second solution, a transmission timer is started when a TB is generated or stored in the HARQ transmission buffer. In some embodiments, the timer value may be set according to the packet delay budget (PDB) of the data contained in the transport block. In such embodiments, the transmission timer may be referred to as a "PDB timer."

While the transmission timer is running the Tx UE 310 is allowed to carry out HARQ (re)transmissions of the TB, for example in the V2X Mode-2 (e.g., with autonomous selection of SL resources). However, when the transmission timer expires the Tx UE 310 is not permitted to make any further HARQ (re)transmission of the TB. In certain embodiments, the Tx UE 310 switches back to V2X Mode-1 communication upon expiry of the timer.

As described above, upon detection of a control channel error, e.g., NACK-to-ACK error on the Uu interface, the Tx UE 310 which is transmitting a TB in the V2X Mode-1 (centralized scheduling, e.g., by the RAN node 305), switches instead to the V2X Mode-2 (distributed scheduling mode, e.g., by the Tx UE 310) and makes further autonomous HARQ retransmissions of the same TB as long as the above mentioned timer is running. Such control channel errors may lead to a situation where the Tx UE 310 sends an NACK to the RAN node 305 in order to request SL resources for further HARQ retransmission, and receives a DCI that does not allocate SL resources for a retransmission, but instead allocated SL resources for an initial HARQ transmission (i.e., of a new TB) because the NACK was detected by the RAN node 305 as an ACK. As mentioned above, such a situation may be detected by the unexpected toggling of NDI.

In order to avoid a packet loss in such a situation, the Tx UE 310 switches to a UE-scheduled mode (e.g., V2X Mode-2) for the transmission of this TB and autonomously selects SL resources (e.g., based on sensing) for further HARQ retransmissions, as long as the corresponding transmission timer is running. In this case, the candidate resource selection window (i.e., T2) is now set accordingly to the remaining PDB budget.

The scenario where the Tx UE 310 expects SL resources for a HARQ retransmission but actually receives a DCI indicating SL resources for an initial transmission, may also happen in the case that DCI (sent by the RAN node 305) indicating SL resources for an HARQ retransmission is not detected by the Tx UE 310, i.e., DCI miss-detection, and the corresponding DTX on the feedback channel is detected as an ACK by the RAN node 305.

In a variant of the second solution, the Tx UE 310 may use the PDB timer as the upper limit for resource reservations when the Tx UE 310 is configured to reserve resources for one or more retransmission. In another variant, when the Tx UE 310 transmit the initial SL SR/BSR transmission to the RAN node 305 requesting SL resource, and it did not receive any SL resource grant from the RAN node 305. The Tx UE 310, according to this variant, may switch to Mode-2 operation when the SL SR transmission reaches the configured allowed SR maximum count. In another case, if the configured SL SR prohibit timer is longer than the PDB for that packet, then the Tx UE 310 may switch to Mode-2 operation for transmitting that packet. In another case, if the Tx UE 310's PRACH fails and if the Tx UE 310 reaches the maximum allowed RACH transmission, then the Tx UE 310 could switch to Mode-2 operations.

According to a third solution (e.g., for resolving SL control channel errors), the Tx UE 310 considers a HARQ transmission buffer as available for transmission of a new TB after a certain predefined criterion is met. According to one implementation of the third solution, the Tx UE 310 considers the transmission buffer of a HARQ process used for SL transmissions as available for the transmission of a new TB when a timer is expired, the timer being associated with a TB or the HARQ process where the TB is stored in. Such as timer may be referred to as a HARQ Tx timer or, alternatively, a transmission buffer timer.

In one such implementation, the HARQ Tx timer may be started when a TB is stored in the transmission buffer of a HARQ buffer, i.e., when initial HARQ transmission is done. The timer value may be set to a value which is related to the packet delay budget (PDB) of the data contained in the TB. As such, this time may indicate an upper bound for the time that the packet may be delayed between the Tx UE 310 and the Rx UE 315(*s*). Upon expiry of the timer, the Tx UE 310 considers the HARQ process as available for new initial HARQ transmissions, e.g., Tx UE 310 can generate a new TB according to a received SL grant or autonomously selected SL grant and store the TB in the HARQ buffer of this HARQ process.

According to another implementation of the third solution, a Tx UE 310 considers the transmission buffer of a HARQ process used for SL transmissions as available for the transmission of a new TB upon having sent an ACK to the RAN node 305 for the TB currently stored in the transmission buffer of that HARQ process (i.e., even though the HARQ Tx timer is not yet expired).

According to another implementation of the third solution, the DCI sent from the RAN node 305 to the Tx UE 310 for allocating SL resources indicates whether the Tx UE 310 can consider the HARQ process for which the SL resources are allocated as available after having made the corresponding indicated SL transmission.

According to one further aspect of the third solution, the timer associated with a TB/HARQ process may be set to a value according to the PDB value of the highest priority sidelink logical channel ("SL LCH") having data within a TB. In an alternative implementation, the value of the timer associated with a TB/HARQ process may be set according to the minimum or maximum PDB value of the SL LCHs having data within a TB. The assumption here is that each SL LCH has some associated PDB value, thus each packet of a SL LCH is associated with a PDB value.

According to a fourth solution (e.g., for managing SL HARQ buffer), the maximum time the corresponding soft buffer of a HARQ process at a Rx UE 315 is occupied by one TB is specified or defined. Note that the "soft buffer" is a buffer storing packets/TBs for HARQ Soft Combining. In order to allow further communication on the SL (e.g., PC5 interface) with V2X UEs, the time a TB is stored in a soft buffer may be limited to some maximum value. It should be noted that a V2X UE may be in communication with several V2X UEs at the same time, therefore the soft buffer management is an important functionality for NR V2X.

According to one implementation of the fourth solution, a timer is associated with each HARQ process and, respectively, the corresponding soft buffer at a V2X Rx UE 315. Such as timer may be referred to as a HARQ Rx timer When the data, e.g., LLR(s), of a new TB is placed/stored at the first time in the soft buffer of an HARQ process, the Rx UE 315 starts the corresponding HARQ Tx timer. The Rx UE 315 may try to decode the data stored in the soft buffer as long as the timer is running and not expired. At timer expiry, the Rx UE 315 may make the HARQ process/buffer available for new data, e.g., replace the data in the soft buffer with some other received data (i.e., data of a different new TB is stored in the soft buffer) or flush the soft buffer.

According to another implementation of the fourth solution, the HARQ Rx timer value may be set according to the Priority (i.e., QoS) information signaled within the SCI for the SL data which is stored in the HARQ process/soft buffer. In a certain implementation, some linkage between the priority (i.e., QoS) information signaled within the SCI and the maximum tolerable decoding delay of a TB (i.e., corresponding to the timer value) is configured or specified (hardcoded in the specifications).

According to another implementation of the fourth solution, the Rx UE 315 may flush the soft buffer of a (receiving) HARQ process or, respectively, replace the data stored in a soft buffer with other data upon a trigger event other than expiry of the HARQ Rx timer. In some embodiments, the trigger event is the sending of an HARQ ACK to the Tx UE 310 for the corresponding SL transmission of the TB which was stored in the soft buffer. In other words, the Rx UE 315 may flush the soft buffer or replace the data of the soft buffer once the data/TB stored in the soft buffer was correctly decoded.

In some embodiments, the trigger event is the receipt of a different TB, which is of higher priority than the data/TB stored in the soft buffer. Accordingly, the Rx UE 315 may replace the data stored in the soft buffer of a HARQ process with some other data, i.e., a different TB, which is of higher priority even though the TB currently stored in the soft buffer was not yet correctly decoded. For cases when the priority information carried in the SCI accompanying the PSSCH (containing the TB) indicates a higher priority than the priority of the TB currently stored in a soft buffer and there are no other HARQ processes available for the reception of a SL transmission, the Rx UE 315 may pre-empt data in a HARQ process with some higher priority SL data.

According to a fifth solution (e.g., for managing SL HARQ buffer), the Sidelink Control Information (SCI) accompanying the SL data channel PSSCH may contain an indication which is used by the Rx UE 315 for the soft buffer management. In one implementation, the SCI indicates the maximum number of HARQ transmissions for a TB. Such information can be used by the Rx UE 315 for managing the soft buffer of the HARQ process. After reception of the last HARQ, transmission of a TB the Rx UE 315 may use the HARQ process for some other SL transmission, i.e., replace the data in the soft buffer with some other received data.

According to an alternative implementation of this fifth solution, the SCI accompanying a PSSCH transmission contains some timing information indicating the maximum time span for the transmission of the corresponding TB on the PC5 interface. Such timing information may be derived based on the packet delay budget (PDB). Upon reception of the SCI, the Rx UE 315 may start a timer set to the indicated time value. Upon expiry of the timer the Rx UE 315 may make the soft buffer available for new data, e.g., flush the soft buffer and/or replace the data currently stored in the soft buffer with some other data.

According to a further alternative implementation of this fifth solution, the SCI accompanying a PSSCH transmission contains a field indicating whether this is the last HARQ (re)transmission of a TB transmitted via the PSSCH. When receiving at the Rx UE 315 a SCI indicating that the corresponding PSSCH carries the last HARQ (re)transmission of the TB, the Rx UE 315 knows to not to expect any further HARQ retransmissions of this TB and, correspondingly, after attempting to decode the TB, the Rx UE 315 may flush the soft buffer and/or use the HARQ process for some other SL transmission, i.e., replace the data currently stored in the soft buffer with some other received data.

According to a sixth solution, for cases when the maximum allowed transmission time is expired the Rx UE 315 transmits an ACK to the Tx UE 310 as HARQ feedback for a SL transmission even though the TB was not able to be decoded correctly. Such maximum allowed transmission time might be related to the packet delay budget associated with the data contained in the TB. The Rx UE 315 may derive the maximum allowed transmission delay for a SL transmission from the Layer-1 source ID or the priority (QoS) information signaled within the SCI accompanying a SL data transmission on the PSSCH.

According to a seventh solution, the Rx UE 315 only sends HARQ feedback to the Tx UE 310 for the transmission of a TB after the last HARQ (re)transmission of this TB, i.e., no HARQ feedback is sent for the other earlier HARQ (re)transmission of a TB. This feedback indicates to the Tx UE 310 whether the TB was correctly decoded (after the last HARQ (re)transmissions) or not. Such behavior is in particular suitable for cases when the Tx UE 310 performs some fixed (i.e., predefined) number of HARQ (re)transmissions of a SL TB, also referred to as "blind HARQ retransmissions," and the Rx UE 315 is ordered to send some HARQ feedback to the Tx UE 310.

According to some alternative implementation of this seventh solution, the Rx UE 315 sends a HARQ feedback, i.e., ACK, as soon as the TB can be correctly decoded in order to prevent the Tx UE 310 from making unnecessary retransmission(s) of this TB. In such a scenario, resources for sending HARQ feedback may be configured for every HARQ transmission of the TB; however, the Rx UE 315 only sends a HARQ ACK after having successfully decoded the TB, e.g., also referred to as "early ACK", or after the last HARQ (re)transmission of the TB. Note that the HARQ feedback sent after the last HARQ (re)transmission may be either ACK or NACK, depending on the decoding result.

According to an eighth solution, when the Tx UE 310 is being scheduled with SL resources by the RAN node 305, e.g., using V2X Mode-1, the Tx UE 310 may skip the SL transmission on the PC5 interface if some certain predefined criteria are fulfilled. Here, the Tx UE 310 further sends back an ACK to the RAN node 305 indicating that no further SL resources for a retransmission are required.

According to one implementation of the eighth solution, the criteria for skipping an SL transmission may be related to the buffer status of the Tx UE 310, e.g., where no SL data is available for transmission on the scheduled resources. Such a situation may occur if there is no data available for transmission due to restrictions during LCP or due to the fact that there is no data in the Tx UE 310's buffer awaiting a transmission. To improve radio interface efficiency, the Tx UE 310 skips the scheduled transmission, rather than sending padding on the SL in such case.

Another criterion for skipping a scheduled SL transmission may be the detection of an error occurring on the control channel, e.g., a NACK-to-ACK error. For example, when the Tx UE 310 may expect SL resource for a retransmission but receives SL resources for a new initial transmission, the Tx UE 310 may skip the scheduled initial SL transmission, according to this solution.

According to another implementation of this eighth solution, the Tx UE 310 does not send any feedback to the RAN node 305, i.e., DTX, on the configured feedback resources upon having skipped the corresponding scheduled SL transmission. Alternatively, the Tx UE 310 may send an explicit signal to the RAN node 305 indicating that the corresponding scheduled SL transmission was skipped by the Tx UE 310. According to a further implementation of the eighth solution, the Tx UE 310 may trigger a SL BSR in case a SL transmission was skipped in order to provide the RAN node 305 with the latest buffer status.

Figure 4:
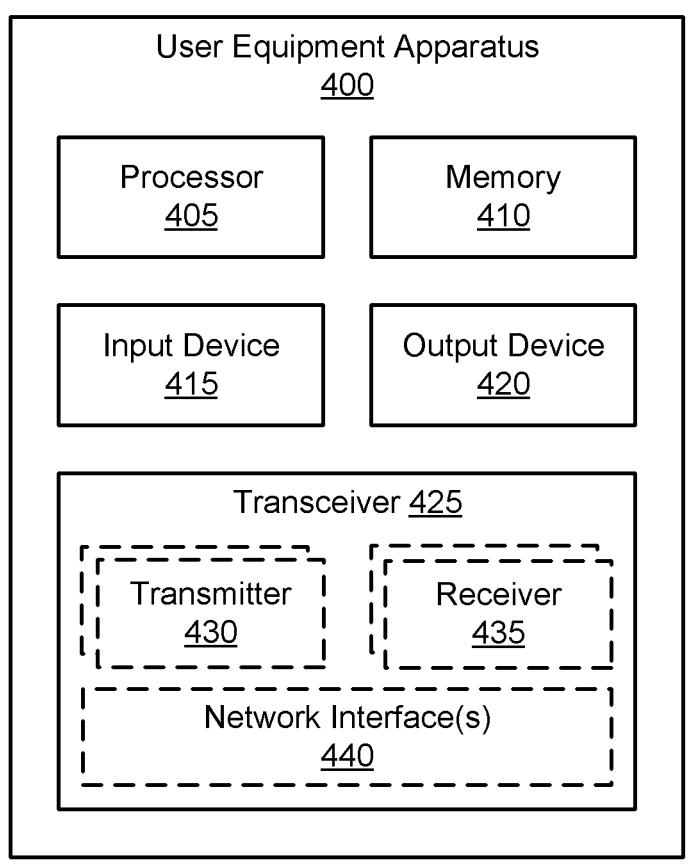
FIG. 4 is a diagram illustrating one embodiment of a user equipment apparatus that may be used for scheduling a sidelink transmission.

FIG. 4 depicts a user equipment apparatus 400 that may be used for scheduling a sidelink transmission, in accordance with aspects of the present disclosure. In various embodiments, the user equipment apparatus 400 is used to implement one or more of the solutions described above. The user equipment apparatus 400 may be one embodiment of the remote unit 105 and/or any of the V2X UEs 205, 310, and 315, described above. Furthermore, the user equipment apparatus 400 may include a processor 405, a memory 410, an input device 415, an output device 420, and a transceiver 425. In some embodiments, the input device 415 and the output device 420 are combined into a single device, such as a touchscreen. In certain embodiments, the user equipment apparatus 400 may not include any input device 415 and/or output device 420. In various embodiments, the user equipment apparatus 400 may include one or more of: the processor 405, the memory 410, and the transceiver 425, and may not include the input device 415 and/or the output device 420.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425.

In various embodiments, the processor 405 controls the user equipment apparatus 400 to implement the above described UE behaviors. In some embodiments, the processor 405 receives, via the transceiver 425, a configuration for a set of SL LCHs with at least one Uu LCH restriction parameter, wherein the SL LCHs communicate data over a PC5 interface 215 supported by the transceiver 425. The processor 405 receives, via internal process, a SL buffer status reporting trigger for a first SL LCH and determines that an UL-SCH resource for a new transmission is available. The processor 405 determines that the at least one Uu LCH restriction parameter of the first SL LCH does not match the uplink transmission parameters associated with the UL-SCH resources available for the new transmission and triggers a Scheduling Request (i.e., for the sidelink buffer status report triggered by the first SL LCH) to a base unit via a Uu interface 210 for PC5 resources.

In some embodiments, the at least one Uu LCH restriction parameter includes one or more of: maximum PUSCH duration, allowed SCS, and allowed serving cell. In certain embodiments, triggering the Scheduling Request occurs in response to the processor 405 detecting that the parameter maxPUSCH-Duration configured for the first SL LCH has a smaller value than the PUSCH transmission duration associated with the UL-SCH resource available for the new transmission. In certain embodiments, triggering the Scheduling Request occurs in response to the processor 405 detecting that a set of allowed SCS for the first SL LCH does not include the SCS associated with the UL-SCH resource available for the new transmission.

In some embodiments, the processor 405 receives a time threshold. In such embodiments, triggering the Scheduling Request occurs in response to the processor 405 determining that UL-SCH resource available for the new transmission are more than the time threshold away in time from the time the SL buffer status reporting trigger for the first SL LCH is received. In certain embodiments, triggering the Scheduling Request occurs in response to the processor 405 determining that the UL-SCH resource available for the new transmission are later in time than a next physical uplink control channel transmission occasion for the Scheduling Request triggered for the first SL LCH.

In various embodiments, the processor 405 transmits, via the transceiver 425, a first TB on SL resources using a first SL mode, where the TB is associated with a first SL HARQ process. The processor 405 detects a HARQ protocol error associated with the TB and retransmits the TB on SL resources using a second SL mode in response to the HARQ protocol error.

In some embodiments, the processor 405 further initiates a timer upon one of: generation of the TB, initial transmission of the TB, and placement of the TB in a HARQ transmission buffer, wherein retransmitting the TB on SL resources using the second SL mode occurs while the timer is not expired. In one embodiment, the timer value is based on a packet delay budget associated with the TB. In another embodiment, the timer value is signaled within SCI accompanying the TB. Here, the timer value included in SCI and used by the Rx UE for HARQ buffer management at receiver side.

In various embodiments, the processor 405 further stores the TB in a HARQ transmission buffer and makes available the HARQ transmission buffer for new data in response to a predefined trigger. In some embodiments, making available the HARQ soft buffer for new data includes one or more of: flushing the HARQ soft buffer and replacing data stored in the HARQ soft buffer with new data.

In certain embodiments, the predefined trigger is the expiry of a timer, wherein the timer is initiated in response to storing the TB in the HARQ transmission buffer. In one embodiment, the timer value is based on a packet delay budget associated with the TB. In another embodiment, the timer value is signaled within SCI accompanying the TB. Here, the timer value indicated within SCI is used at the Rx UE side.

In certain embodiments, the predefined trigger includes receiving an indication in DCI. In certain embodiments, the predefined trigger includes sending an ACK corresponding to the TB to a base unit.

In various embodiments, the processor 405 receives, via the transceiver 425, a TB on SL resources, where the TB is associated with a SL HARQ process. The processor 405 stores the TB in a HARQ soft buffer and makes available the HARQ soft buffer for new data in response to a predefined trigger.

In some embodiments, making available the HARQ soft buffer for new data includes one or more of: flushing the HARQ soft buffer and replacing data stored in the HARQ soft buffer with new data.

In certain embodiments, the predefined trigger is the expiry of a timer, wherein the timer is initiated in response to storing the TB in the HARQ soft buffer. In one embodiment, the length of the timer is based on a packet delay budget associated with the TB. In another embodiment, the length of the timer is based on some information carried in the SCI accompanying the TB.

In certain embodiments, the predefined trigger includes sending an ACK corresponding to the TB to a V2X UE. In certain embodiments, the predefined trigger includes receiving a second TB having a higher priority than the TB stored in the HARQ soft buffer.

In various embodiments, the processor 405 receives, via the transceiver 425, a TB on SL resources, where the TB is associated with predefined number of blind HARQ retransmissions. The processor 405 decodes the TB and determines whether the TB is correctly decoded.

In response to correctly decoding the TB, the processor 405 sends a positive HARQ acknowledgement prior to a last of the blind HARQ retransmissions. Otherwise, the processor 405 sends a negative HARQ acknowledgement in response to incorrectly decoding an initial transmission of the TB and each of the blind HARQ retransmissions the TB, where no negative HARQ acknowledgement is sent prior to receiving the last of the blind HARQ retransmissions.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media.

In some embodiments, the memory 410 stores data relating to scheduling a sidelink transmission. For example, the memory 410 may store V2X communication resources, HARQ processes, and the like. In certain embodiments, the memory 410 also stores program code and related data, such as an operating system or other controller algorithms operating on the remote unit 105.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The output device 420, in one embodiment, is designed to output visual, audible, and/or haptic signals. In some embodiments, the output device 420 includes an electronically controllable display or display device capable of outputting visual data to a user. For example, the output device 420 may include, but is not limited to, an LCD display, an LED display, an OLED display, a projector, or similar display device capable of outputting images, text, or the like to a user. As another, non-limiting, example, the output device 420 may include a wearable display separate from, but communicatively coupled to, the rest of the user equipment apparatus 400, such as a smart watch, smart glasses, a heads-up display, or the like. Further, the output device 420 may be a component of a smart phone, a personal digital assistant, a television, a table computer, a notebook (laptop) computer, a personal computer, a vehicle dashboard, or the like.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, the output device 420 may be located near the input device 415.

The transceiver 425 includes at least transmitter 430 and at least one receiver 435. One or more transmitters 430 may be used to provide UL communication signals to a base unit 110, such as the UL transmissions described herein. Similarly, one or more receivers 435 may be used to receive DL communication signals from the base unit 110, as described herein. Although only one transmitter 430 and one receiver 435 are illustrated, the user equipment apparatus 400 may have any suitable number of transmitters 430 and receivers 435. Further, the transmitter(s) 430 and the receiver(s) 435 may be any suitable type of transmitters and receivers. In one embodiment, the transceiver 425 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 425, transmitters 430, and receivers 435 may be implemented as physically separate components that access a shared hardware resource and/or software resource, such as for example, the network interface 440.

In various embodiments, one or more transmitters 430 and/or one or more receivers 435 may be implemented and/or integrated into a single hardware component, such as a multi-transceiver chip, a system-on-a-chip, an ASIC, or other type of hardware component. In certain embodiments, one or more transmitters 430 and/or one or more receivers 435 may be implemented and/or integrated into a multi-chip module. In some embodiments, other components such as the network interface 440 or other hardware components/circuits may be integrated with any number of transmitters 430 and/or receivers 435 into a single chip. In such embodiment, the transmitters 430 and receivers 435 may be logically configured as a transceiver 425 that uses one more common control signals or as modular transmitters 430 and receivers 435 implemented in the same hardware chip or in a multi-chip module.

Figure 5:
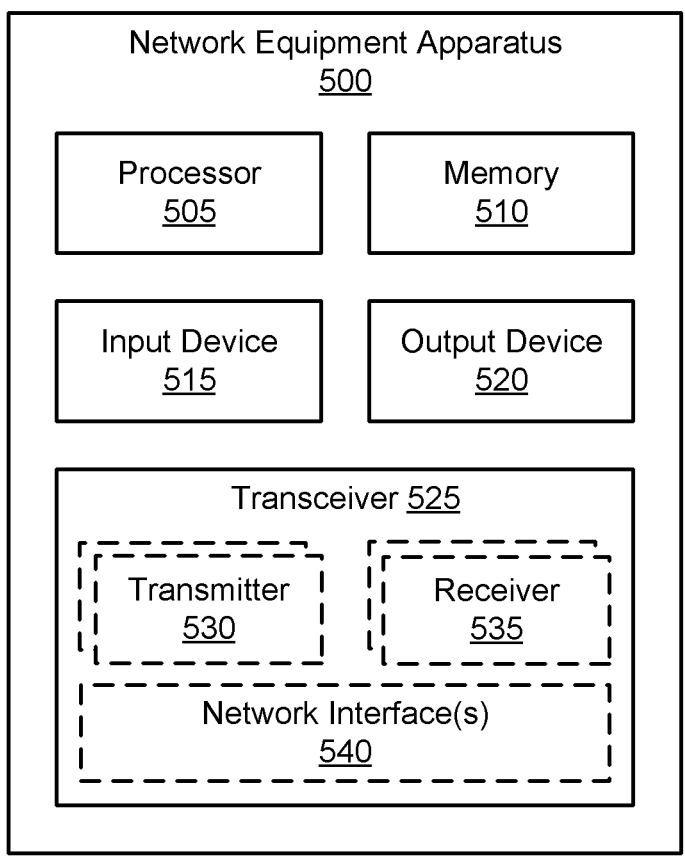
FIG. 5 is a diagram illustrating one embodiment of a network equipment apparatus that may be used for scheduling a sidelink transmission.

FIG. 5 depicts one embodiment of a network equipment apparatus 500 that may be used for selective security protection of user plane traffic, in accordance with aspects of the present disclosure. The network equipment apparatus 500 may be one embodiment of the base unit 121 and/or the RAN node 305. Furthermore, the network equipment apparatus 500 may include a processor 505, a memory 510, an input device 515, an output device 520, a transceiver 525. In some embodiments, the input device 515 and the output device 520 are combined into a single device, such as a touch screen. In certain embodiments, the network equipment apparatus 500 does not include any input device 515 and/or output device 520.

As depicted, the transceiver 525 includes at least one transmitter 530 and at least one receiver 535. Here, the transceiver 525 communicates with one or more remote units 105 to provide access to one or more PLMNs. Additionally, the transceiver 525 may support at least one network interface 540. In some embodiments, the transceiver 525 supports a first interface (e.g., Uu interface) that communicates with a remote unit (e.g., UE) over an access network, a second interface (e.g., an N2 interface) that communicates with control-plane functions (e.g., SMF) in a mobile core network (e.g., a 5GC), and a third interface (e.g., an N3 interface) that communicates with a user-plane function (e.g., UPF) in the mobile core network.

The processor 505, in one embodiment, may include any known controller capable of executing computer-readable instructions and/or capable of performing logical operations. For example, the processor 505 may be a microcontroller, a microprocessor, a CPU, a GPU, an auxiliary processing unit, a FPGA, or similar programmable controller. In some embodiments, the processor 505 executes instructions stored in the memory 510 to perform the methods and routines described herein. The processor 505 is communicatively coupled to the memory 510, the input device 515, the output device 520, and the first transceiver 525.

In various embodiments, the processor 505 controls the network equipment apparatus 500 to implement the above described RAN node behaviors. In some embodiments, via the transceiver 525 the processor 505 configures for a set of SL LCHs with at least one Uu LCH restriction parameter. In certain embodiments, the processor 505 receives a SR for the SL BSR triggered by the first SL LCH.

The memory 510, in one embodiment, is a computer readable storage medium. In some embodiments, the memory 510 includes volatile computer storage media. For example, the memory 510 may include a RAM, including DRAM, SDRAM, and/or SRAM. In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data relating to scheduling a sidelink transmission, for example storing V2X communication resources, HARQ processes, and the like. In certain embodiments, the memory 510 also stores program code and related data, such as an operating system ("OS") or other controller algorithms operating on the network equipment apparatus 500 and one or more software applications.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, may include any known electronically controllable display or display device. The output device 520 may be designed to output visual, audible, and/or haptic signals. In some embodiments, the output device 520 includes an electronic display capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, all or portions of the output device 520 may be located near the input device 515.

As discussed above, the transceiver 525 may communicate with one or more remote units to provide access to one or more PLMNs. The transceiver 525 may also communicate with one or more network functions (e.g., in the mobile core network 140). The transceiver 525 operates under the control of the processor 505 to transmit messages, data, and other signals and also to receive messages, data, and other signals. For example, the processor 505 may selectively activate the transceiver (or portions thereof) at particular times in order to send and receive messages.

In various embodiments, the transceiver 525 includes at least one transmitter 530 and at least one receiver 535. One or more transmitters 530 may be used to provide DL communication signals to a remote unit 105, such as the network-scheduled SL grant according to NR V2X Mode-1, described herein. Similarly, one or more receivers 535 may be used to receive UL communication signals from the remote unit 105, as described herein. Although only one transmitter 530 and one receiver 535 are illustrated, the network equipment apparatus 500 may have any suitable number of transmitters 530 and receivers 535. Further, the transmitter(s) 530 and the receiver(s) 535 may be any suitable type of transmitters and receivers.

In certain embodiments, the transmitter/receiver pair used to communicate with a remote unit 105 may be combined into a single transceiver unit, for example a single chip performing functions for use with both licensed and unlicensed radio spectrum. In some embodiments, the transmitter/receiver pair may share one or more hardware components. For example, certain transceivers 525, transmitters 530, and receivers 535 may be implemented as physically separate components that access a shared hardware resource and/or software resource, such as for example, the network interface 540.

In various embodiments, one or more transmitters 530 and/or one or more receivers 535 may be implemented and/or integrated into a single hardware component, such as a multi-transceiver chip, a system-on-a-chip, an application specific integrated circuit ("ASIC"), or other type of hardware component. In certain embodiments, one or more transmitters 530 and/or one or more receivers 535 may be implemented and/or integrated into a multi-chip module. In some embodiments, other components such as the network interface 540 or other hardware components/circuits may be integrated with any number of transmitters 530 and/or receivers 535 into a single chip. In such embodiment, the transmitters 530 and receivers 535 may be logically configured as a transceiver 525 that uses one more common control signals or as modular transmitters 530 and receivers 535 implemented in the same hardware chip or in a multi-chip module.

Figure 6:
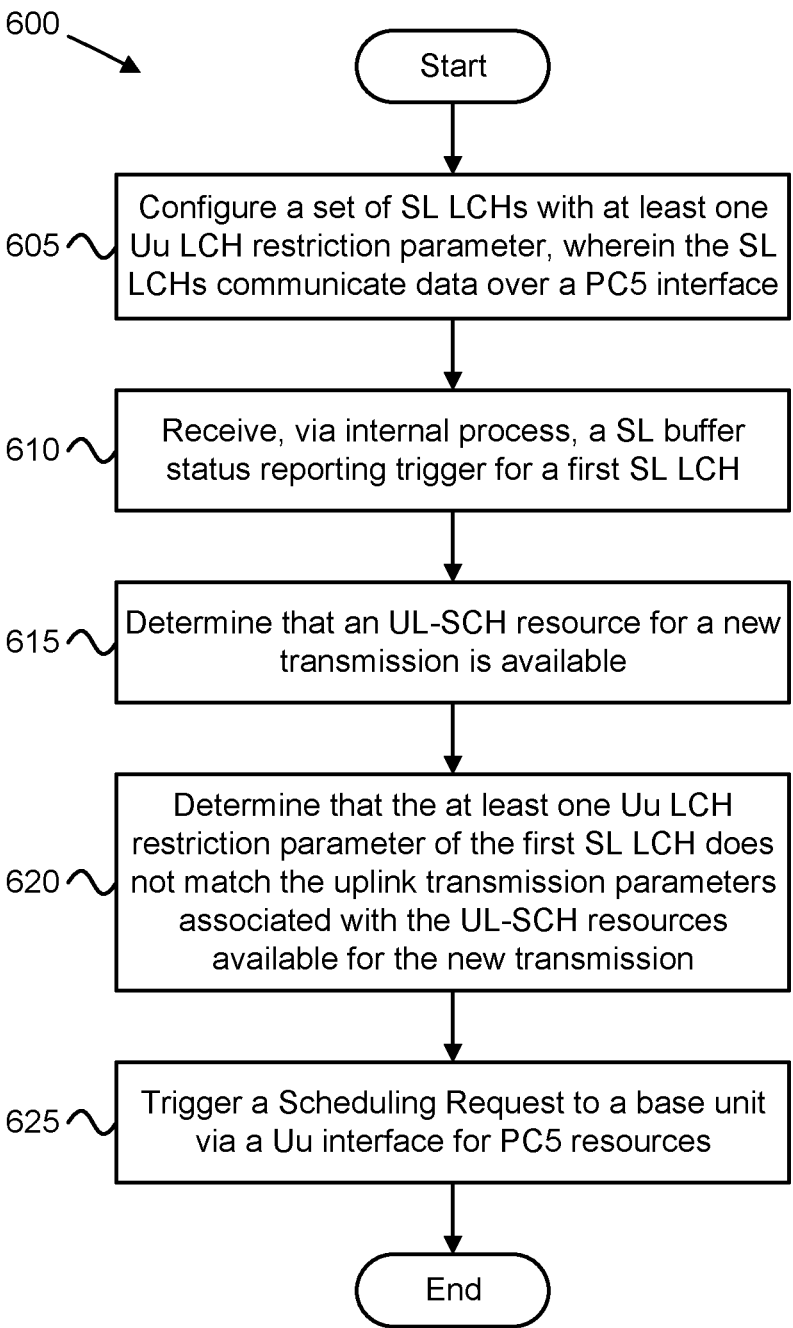
FIG. 6 is a flowchart diagram illustrating one embodiment of a method that may be used for scheduling a sidelink transmission.

FIG. 6 depicts one embodiment of a method 600 for scheduling a sidelink transmission, in accordance with aspects of the present disclosure. In various embodiments, the method 600 is performed by a UE, such as the remote unit 105, the UE 205, the Tx UE 310, and/or the user equipment apparatus 400, described above. In some embodiments, the method 600 is performed by a processor, such as a microcontroller, a microprocessor, a CPU, a GPU, an auxiliary processing unit, a FPGA, or the like.

The method 600 begins and configures 605 a set of SL LCHs with at least one Uu LCH restriction parameter, wherein the SL LCHs communicate data over a PC5 interface. The method 600 includes receiving 610, via internal process, a SL buffer status reporting trigger for a first SL LCH. The method 600 includes determining 615 that an UL-SCH resource for a new transmission is available. The method 600 includes determining 620 that the at least one Uu LCH restriction parameter of the first SL LCH does not match the uplink transmission parameters associated with the UL-SCH resources available for the new transmission. The method 600 includes triggering 625 a Scheduling Request to a base unit via a Uu interface for PC5 resources. The method 600 ends.

Figure 7:
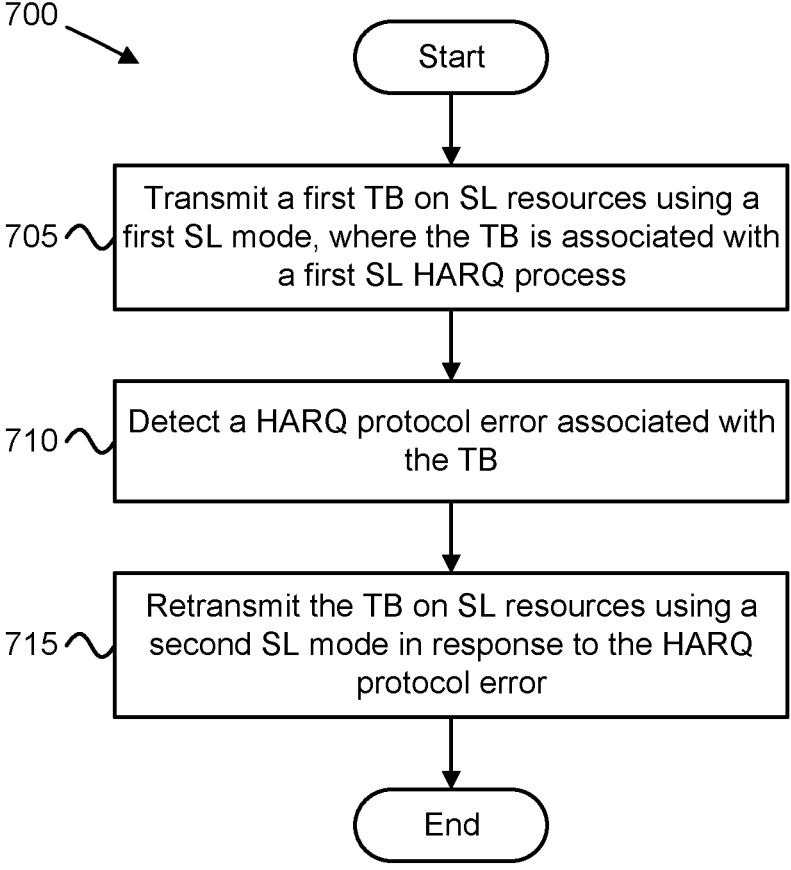
FIG. 7 is a flowchart diagram illustrating one embodiment of a method that may be used for scheduling a sidelink transmission.

FIG. 7 depicts one embodiment of a method 700 for scheduling a sidelink transmission, in accordance with aspects of the present disclosure. In various embodiments, the method 700 is performed by a UE, such as the remote unit 105, the UE 205, the Tx UE 310, and/or the user equipment apparatus 400, described above. In some embodiments, the method 700 is performed by a processor, such as a microcontroller, a microprocessor, a CPU, a GPU, an auxiliary processing unit, a FPGA, or the like.

The method 700 begins and transmits 705 a first TB on SL resources using a first SL mode, where the TB is associated with a first SL HARQ process. The method 700 includes detecting 710 a HARQ protocol error associated with the TB. The method 700 includes retransmitting 715 the TB on SL resources using a second SL mode in response to the HARQ protocol error. The method 700 ends.

Figure 8:
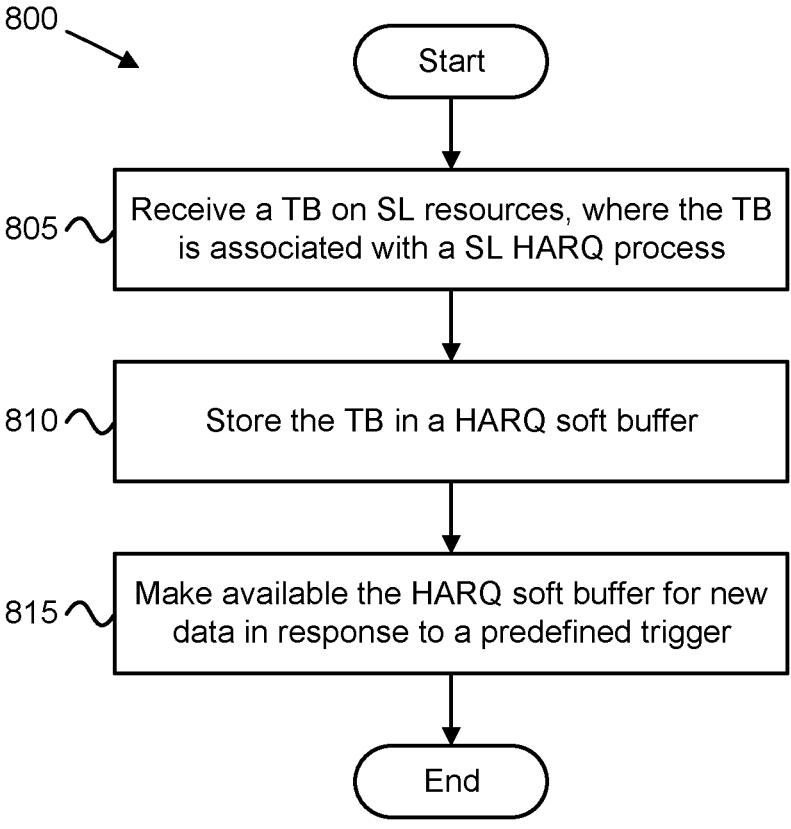
FIG. 8 is a flowchart diagram illustrating one embodiment of a method that may be used for scheduling a sidelink transmission.

FIG. 8 depicts one embodiment of a method 800 for scheduling a sidelink transmission, in accordance with aspects of the present disclosure. In various embodiments, the method 800 is performed by a UE, such as the remote unit 105, the UE 205, the Rx UE 315, and/or the user equipment apparatus 400, described above. In some embodiments, the method 800 is performed by a processor, such as a microcontroller, a microprocessor, a CPU, a GPU, an auxiliary processing unit, a FPGA, or the like.

The method 800 begins and receives 805 a TB on SL resources, where the TB is associated with a SL HARQ process. The method 800 includes storing 810 the TB in a HARQ soft buffer. The method 800 includes making available 815 the HARQ soft buffer for new data in response to a predefined trigger. The method 800 ends.

Figure 9:
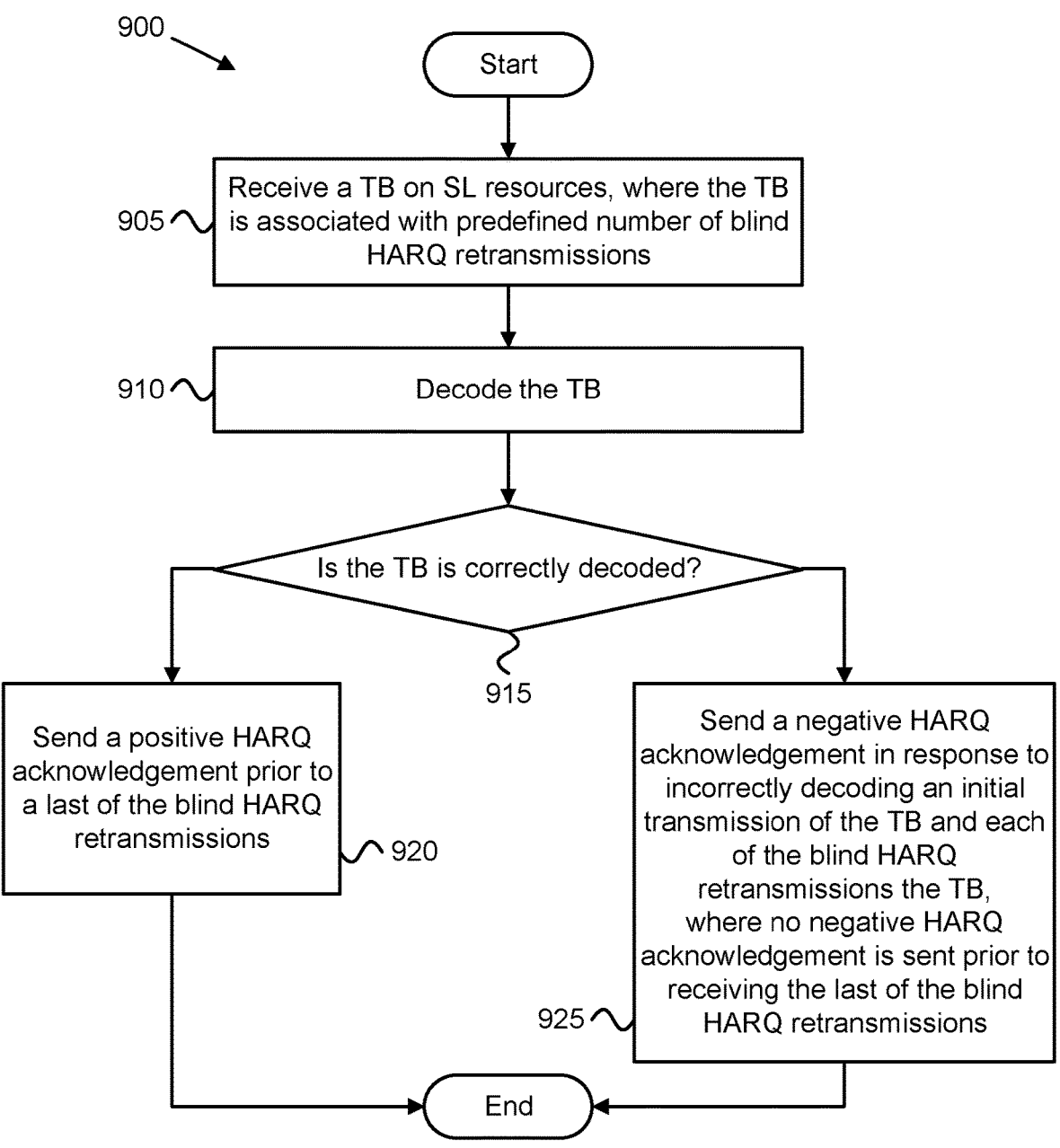
FIG. 9 is a flowchart diagram illustrating one embodiment of a method that may be used for scheduling a sidelink transmission.

FIG. 9 depicts one embodiment of a method 900 for scheduling a sidelink transmission, in accordance with aspects of the present disclosure. In various embodiments, the method 900 is performed by a UE, such as the remote unit 105, the UE 205, the Rx UE 315, and/or the user equipment apparatus 400, described above. In some embodiments, the method 900 is performed by a processor, such as a microcontroller, a microprocessor, a CPU, a GPU, an auxiliary processing unit, a FPGA, or the like.

The method 900 begins and receives 905 a TB on SL resources, where the TB is associated with predefined number of blind HARQ retransmissions. The method 900 includes decoding 910 the TB and determining 915 whether the TB is correctly decoded.

In response to correctly decoding the TB, the method 900 includes sending 920 a positive HARQ acknowledgement prior to a last of the blind HARQ retransmissions. Otherwise, the method 900 includes sending 925 a negative HARQ acknowledgement in response to incorrectly decoding an initial transmission of the TB and each of the blind HARQ retransmissions the TB, where no negative HARQ acknowledgement is sent prior to receiving the last of the blind HARQ retransmissions. The method 900 ends.

Disclosed herein is a first apparatus for scheduling a sidelink transmission, in accordance with aspects of the present disclosure. The first apparatus may be implemented by a UE, such as the remote unit 105, the UE 205, the Tx UE 310, and/or the user equipment apparatus 400. The first apparatus includes a processor and a transceiver that receives a configuration for a set of SL LCHs with at least one Uu LCH restriction parameter, wherein the SL LCHs communicate data over a PC5 interface supported by the transceiver. The processor receives, via internal process, a SL buffer status reporting trigger for a first SL LCH and determines that an UL-SCH resource for a new transmission is available. The processor determines that the at least one Uu LCH restriction parameter of the first SL LCH does not match the uplink transmission parameters associated with the UL-SCH resources available for the new transmission and triggers a Scheduling Request to a base unit via a Uu interface for PC5 resources.

In some embodiments, the at least one Uu LCH restriction parameter includes one or more of: maximum PUSCH duration, allowed SCS, and allowed serving cell. In certain embodiments, triggering the Scheduling Request occurs in response to the processor detecting that the parameter max-PUSCH-Duration configured for the first SL LCH has a smaller value than the PUSCH transmission duration associated with the UL-SCH resource available for the new transmission. In certain embodiments, triggering the Scheduling Request occurs in response to the processor detecting that a set of allowed SCS for the first SL LCH does not include the SCS associated with the UL-SCH resource available for the new transmission.

In some embodiments, the processor receives a time threshold. In such embodiments, triggering the Scheduling Request occurs in response to the processor determining that UL-SCH resource available for the new transmission are more than the time threshold away in time from the time the SL buffer status reporting trigger for the first SL LCH is received. In certain embodiments, triggering the Scheduling Request occurs in response to the processor determining that the UL-SCH resource available for the new transmission are later in time than a next physical uplink control channel transmission occasion for the Scheduling Request triggered for the first SL LCH.

Disclosed herein is a first method for scheduling a sidelink transmission, in accordance with aspects of the present disclosure. The first method may be performed by a UE, such as the remote unit 105, the UE 205, the Tx UE 310, and/or the user equipment apparatus 400. The first method includes configuring a set of SL LCHs with at least one Uu LCH restriction parameter, wherein the SL LCHs communicate data over a PC5 interface. The first method includes receiving, via internal process, a SL buffer status reporting trigger for a first SL LCH and determining that an UL-SCH resource for a new transmission is available. The first method includes determining that the at least one Uu LCH restriction parameter of the first SL LCH does not match the uplink transmission parameters associated with the UL-SCH resources available for the new transmission and triggering a Scheduling Request to a base unit via a Uu interface for PC5 resources.

In some embodiments, the at least one Uu LCH restriction parameter includes one or more of: maximum PUSCH duration, allowed SCS, and allowed serving cell. In certain embodiments, triggering the Scheduling Request occurs in response to detecting that the parameter maxPUSCH-Duration configured for the first SL LCH has a smaller value than the PUSCH transmission duration associated with the UL-SCH resource available for the new transmission. In certain embodiments, triggering the Scheduling Request occurs in response to detecting that a set of allowed SCS for the first SL LCH does not include the SCS associated with the UL-SCH resource available for the new transmission.

In some embodiments, the first method includes receiving a time threshold. In such embodiments, triggering the Scheduling Request occurs in response to determining that UL-SCH resource available for the new transmission are more than the time threshold away in time from the time the SL buffer status reporting trigger for the first SL LCH is received. In certain embodiments, triggering the Scheduling Request occurs in response to determining that the UL-SCH resource available for the new transmission are later in time than a next physical uplink control channel transmission occasion for the Scheduling Request triggered for the first SL LCH.

Disclosed herein is a second apparatus for scheduling a sidelink transmission, in accordance with aspects of the present disclosure. The second apparatus may be implemented by a UE, such as the remote unit 105, the UE 205, the Tx UE 310, and/or the user equipment apparatus 400. The second apparatus includes a processor and a transceiver that transmits a first TB on SL resources using a first SL mode, where the TB is associated with a first SL HARQ process. The processor detects a HARQ protocol error associated with the TB and retransmits the TB on SL resources using a second SL mode in response to the HARQ protocol error.

In some embodiments, the processor further initiates a timer upon one of: generation of the TB, initial transmission of the TB, and placement of the TB in a HARQ transmission buffer, wherein retransmitting the TB on SL resources using the second SL mode occurs while the timer is not expired. In one embodiment, the timer value is based on a packet delay budget associated with the TB. In another embodiment, the timer value is signaled within SCI accompanying the TB.

In various embodiments, the processor further stores the TB in a HARQ transmission buffer and makes available the HARQ transmission buffer for new data in response to a predefined trigger. In some embodiments, making available the HARQ soft buffer for new data includes one or more of: flushing the HARQ soft buffer and replacing data stored in the HARQ soft buffer with new data.

In certain embodiments, the predefined trigger is the expiry of a timer, wherein the timer is initiated in response to storing the TB in the HARQ transmission buffer. In one embodiment, the timer value is based on a packet delay budget associated with the TB. In another embodiment, the timer value is signaled within SCI accompanying the TB.

In certain embodiments, the predefined trigger includes receiving an indication in DCI. In certain embodiments, the predefined trigger includes sending an ACK corresponding to the TB to a base unit.

Disclosed herein is a second method for scheduling a sidelink transmission, in accordance with aspects of the present disclosure. The second method may be performed by a UE, such as the remote unit 105, the UE 205, the Tx UE 310, and/or the user equipment apparatus 400. The second method includes transmitting a first TB on SL resources using a first SL mode, where the TB is associated with a first SL HARQ process. The second method includes detecting a HARQ protocol error associated with the TB and retransmitting the TB on SL resources using a second SL mode in response to the HARQ protocol error.

In some embodiments, the second method includes initiating a timer upon one of: generation of the TB, initial transmission of the TB, and placement of the TB in a HARQ transmission buffer, wherein retransmitting the TB on SL resources using a second SL mode occurs while the timer is not expired. In one embodiment, the timer value is based on a packet delay budget associated with the TB. In another embodiment, the timer value is signaled within SCI accompanying the TB.

In various embodiments, the second method further includes storing the TB in a HARQ transmission buffer and making available the HARQ transmission buffer for new data in response to a predefined trigger. In some embodiments, making available the HARQ soft buffer for new data includes one or more of: flushing the HARQ soft buffer and replacing data stored in the HARQ soft buffer with new data.

In certain embodiments, the predefined trigger is the expiry of a timer, wherein the timer is initiated in response to storing the TB in the HARQ transmission buffer. In one embodiment, the timer value is based on a packet delay budget associated with the TB. In another embodiment, the timer value is signaled within SCI accompanying the TB.

In certain embodiments, the predefined trigger includes receiving an indication in DCI. In certain embodiments, the predefined trigger includes sending an ACK corresponding to the TB to a base unit.

Disclosed herein is a third apparatus for scheduling a sidelink transmission, in accordance with aspects of the present disclosure. The third apparatus may be implemented by a UE, such as the remote unit 105, the UE 205, the Rx UE 315, and/or the user equipment apparatus 400. The third apparatus includes a processor and a transceiver that receives a TB on SL resources, where the TB is associated with a SL HARQ process. The processor stores the TB in a HARQ soft buffer and makes available the HARQ soft buffer for new data in response to a predefined trigger.

In some embodiments, making available the HARQ soft buffer for new data includes one or more of: flushing the HARQ soft buffer and replacing data stored in the HARQ soft buffer with new data.

In certain embodiments, the predefined trigger is the expiry of a timer, wherein the timer is initiated in response to storing the TB in the HARQ soft buffer. In one embodiment, the length of the timer is based on a packet delay budget associated with the TB. In another embodiment, the length of the timer is based on some information carried in the SCI accompanying the TB.

In certain embodiments, the predefined trigger includes sending an ACK corresponding to the TB to a V2X UE. In certain embodiments, the predefined trigger includes receiving a second TB having a higher priority than the TB stored in the HARQ soft buffer.

Disclosed herein is a third method for scheduling a sidelink transmission, in accordance with aspects of the present disclosure. The third method may be performed by a UE, such as the remote unit 105, the UE 205, the Rx UE 315, and/or the user equipment apparatus 400. The third method includes receiving a TB on SL resources, where the TB is associated with a SL HARQ process. The third method includes storing the TB in a HARQ soft buffer and making available the HARQ soft buffer for new data in response to a predefined trigger.

In some embodiments, making available the HARQ soft buffer for new data includes one or more of: flushing the HARQ soft buffer and replacing data stored in the HARQ soft buffer with new data.

In certain embodiments, the predefined trigger is the expiry of a timer, wherein the timer is initiated in response to storing the TB in the HARQ soft buffer. In one embodiment, the length of the timer is based on a packet delay budget associated with the TB. In another embodiment, the length of the timer is based on some information carried in the SCI accompanying the TB.

In certain embodiments, the predefined trigger includes sending an ACK corresponding to the TB to a V2X UE. In certain embodiments, the predefined trigger includes receiving a second TB having a higher priority than the TB stored in the HARQ soft buffer.

Disclosed herein is a fourth apparatus for scheduling a sidelink transmission, in accordance with aspects of the present disclosure. The fourth apparatus may be implemented by a UE, such as the remote unit 105, the UE 205, the Rx UE 315, and/or the user equipment apparatus 400. The fourth apparatus includes a processor and a transceiver that receives a TB on SL resources, where the TB is associated with predefined number of blind HARQ retransmissions. The processor decodes the TB and determines whether the TB is correctly decoded.

In response to correctly decoding the TB, the processor sends a positive HARQ acknowledgement prior to a last of the blind HARQ retransmissions. Otherwise, the processor sends a negative HARQ acknowledgement in response to incorrectly decoding an initial transmission of the TB and each of the blind HARQ retransmissions the TB, where no negative HARQ acknowledgement is sent prior to receiving the last of the blind HARQ retransmissions.

Disclosed herein is a fourth method for scheduling a sidelink transmission, in accordance with aspects of the present disclosure. The fourth method may be performed by a UE, such as the remote unit 105, the UE 205, the Rx UE 315, and/or the user equipment apparatus 400. The fourth method includes receiving a TB on SL resources, where the TB is associated with predefined number of blind HARQ retransmissions. The fourth method includes decoding the TB and determining whether the TB is correctly decoded.

In response to correctly decoding the TB, the fourth method includes sending a positive HARQ acknowledgement prior to a last of the blind HARQ retransmissions. Otherwise, the fourth method includes sending a negative HARQ acknowledgement in response to incorrectly decoding an initial transmission of the TB and each of the blind HARQ retransmissions the TB, where no negative HARQ acknowledgement is sent prior to receiving the last of the blind HARQ retransmissions.

Disclosed herein is a fifth method for scheduling a sidelink transmission, in accordance with aspects of the present disclosure. The fifth method may be performed by a UE, such as the remote unit 105, the UE 205, the Rx UE 315, and/or the user equipment apparatus 400. In certain embodiments, the fifth method may be performed by a processor, for example comprising at least one controller coupled with at least one memory and configured to cause the processor to perform the method steps. The fifth method includes storing a TB in a buffer associated with a SL HARQ process and transmitting an ACK for the TB. The fifth method includes enabling the SL HARQ process for new data in response to transmitting the ACK.

In some embodiments, the fifth method includes receiving the TB from a Tx UE. In such embodiments, transmitting the ACK includes transmitting the ACK to the Tx UE in response to successfully decoding the TB. In some embodiments, the fifth method includes overwriting the buffer with other data. In certain embodiments, the other data comprises data having a higher priority than the TB.

In some embodiments, the fifth method includes transmitting the TB to an Rx UE and receiving a respective ACK from the Rx UE. In such embodiments, the fifth method includes transmitting the ACK to a base station in response to receiving the respective ACK. In certain embodiments, the fifth method may further include flushing the buffer in response to a DCI.

In some embodiments, the fifth method includes initiating a timer in response to storing the TB in the buffer and flushing the buffer in response to an expiration of the timer. In certain embodiments, a length of the timer is based on a packet delay budget associated with the TB.

In some embodiments, to enable the SL HARQ process for new data, the fifth method includes flushing the buffer. In some embodiments, to enable the SL HARQ process for new data, the fifth method includes storing new data in the buffer.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE) for wireless communication, comprising:

at least one memory; and at least one processor coupled with the at least one memory and configured to cause the UE to:

store a transport block (TB) in a transmission buffer associated with a sidelink (SL) hybrid automatic repeat request (HARQ) process associated with a scheduled SL transmission;

determine whether a positive acknowledgement (ACK) for the TB is received;

determine whether a maximum transmission time associated with the TB is reached;

transmit the ACK to a base station in response to the ACK being received and in response to the maximum transmission time being reached;

flush the transmission buffer associated with the SL HARQ process in response to transmitting the ACK or in response to the maximum transmission time being reached; and enable the SL HARQ process for new data in response to transmitting the ACK.

2. The UE of claim 1, wherein the at least one processor is further configured to cause the UE to overwrite the transmission buffer with other data.

3. The UE of claim 2, wherein the other data comprises data having a higher priority than the TB.

4. The UE of claim 1, wherein the at least one processor is configured to cause the UE to:

transmit the TB to a receiver UE (Rx UE); and receive the ACK from the Rx UE.

5. The UE of claim 4, wherein the at least one processor is further configured to cause the UE to flush the transmission buffer in response to a downlink control information (DCI).

6. The UE of claim 1, wherein the at least one processor is further configured to cause the UE to:

initiate a timer in response to storing the TB in the transmission buffer; and flush the transmission buffer in response to an expiration of the timer.

7. The UE of claim 6, wherein a length of the timer is based on the maximum transmission time, and wherein the maximum transmission time is a packet delay budget associated with the TB.

8. The UE of claim 1, wherein the at least one processor is configured to cause the UE to store new data in the transmission buffer.

9. A processor for wireless communication, comprising:

at least one controller coupled with at least one memory and configured to cause the processor to:

store a transport block (TB) in a transmission buffer associated with a sidelink (SL) hybrid automatic repeat request (HARQ) process associated with a scheduled SL transmission;

determine whether a positive acknowledgement (ACK) for the TB is received;

determine whether a maximum transmission time associated with the TB is reached;

transmit the ACK to a base station in response to the ACK being received and in response to the maximum transmission time being reached;

flush the transmission buffer associated with the SL HARQ process in response to transmitting the ACK or in response to the maximum transmission time being reached; and enable the SL HARQ process for new data in response to transmitting the ACK.

10. The processor of claim 9, wherein the at least one controller is further configured to cause the processor to overwrite the transmission buffer with other data.

11. The processor of claim 10, wherein the other data comprises data having a higher priority than the TB.

12. The processor of claim 9, wherein the at least one controller is configured to cause the processor to:

transmit the TB to a receiver user equipment (Rx UE); and receive the ACK from the Rx UE.

13. The processor of claim 12, wherein the at least one controller is further configured to cause the processor to flush the transmission buffer in response to a reception of a downlink control information (DCI).

14. The processor of claim 9, wherein the at least one controller is further configured to cause the processor to:

initiate a timer in response to storing the TB in the transmission buffer, and flush the transmission buffer in response to expiry of the timer.

15. The processor of claim 14, wherein a length of the timer is based on the maximum transmission time, and wherein the maximum transmission time is a packet delay budget associated with the TB.

16. The processor of claim 9, wherein to enable the SL HARQ process for new data, the at least one controller is configured to cause the processor to store new data in the transmission buffer.

17. A method of a user equipment (UE), the method comprising:

storing a transport block (TB) in a transmission buffer associated with a sidelink (SL) hybrid automatic repeat request (HARQ) process associated with a scheduled SL transmission;

determining whether a positive acknowledgement (ACK) for the TB is received;

determining whether a maximum transmission time associated with the TB is reached;

transmitting the ACK to a base station in response to the ACK being received and in response to the maximum transmission time being reached;

flushing the transmission buffer associated with the SL HARQ process in response to transmitting the ACK or in response to the maximum transmission time being reached; and enabling the SL HARQ process for new data in response to transmitting the ACK.

18. The method of claim 17, further comprising overwriting the transmission buffer with other data.

19. The method of claim 18, wherein the other data comprises data having a higher priority than the TB.

20. The method of claim 17, further comprising:

transmitting the TB to a receiver UE (Rx UE); and receiving the ACK from the Rx UE.

21. The method of claim 20, further comprising flushing the transmission buffer in response to a downlink control information (DCI).

\* \* \* \* \*